US011218451B2

(12) United States Patent
Zhou

(10) Patent No.: US 11,218,451 B2
(45) Date of Patent: Jan. 4, 2022

(54) DEVICE BOOTSTRAP METHOD, TERMINAL, AND SERVER

(71) Applicant: Huawei Technologies Co., Ltd., Shenzhen (CN)

(72) Inventor: Kai Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 16/913,180

(22) Filed: Jun. 26, 2020

(65) Prior Publication Data
US 2020/0329013 A1 Oct. 15, 2020

Related U.S. Application Data

(63) Continuation of application No. PCT/CN2018/123457, filed on Dec. 25, 2018.

(30) Foreign Application Priority Data

Dec. 29, 2017 (CN) .......................... 201711477985.7

(51) Int. Cl.
*G06F 21/00* (2013.01)
*G06F 7/04* (2006.01)
(Continued)

(52) U.S. Cl.
CPC ............ *H04L 63/04* (2013.01); *H04L 63/062* (2013.01); *H04L 63/1458* (2013.01); *H04W 4/14* (2013.01);
(Continued)

(58) Field of Classification Search
CPC ... H04L 63/04; H04L 63/062; H04L 63/1458; H04W 76/11; H04W 4/14
(Continued)

(56) References Cited

U.S. PATENT DOCUMENTS 10,148,736 B1 * 12/2018 Lee .................... H04L 67/1097
2006/0039564 A1   2/2006 Rao
(Continued)

FOREIGN PATENT DOCUMENTS

CN       101990203 A      3/2011
CN       102045702 A      5/2011
(Continued)

OTHER PUBLICATIONS

Vangelis Gazis et al.,"A Survey of Standards for Machine-to-Machine and the Internet of Things",IEEE Communications Surveys and Tutorials, vol. 19, No. 1, First Quarter 2017,total 30 pages.
(Continued)

*Primary Examiner* — Haresh N Patel
(74) *Attorney, Agent, or Firm* — Conley Rose, P.C.

(57) ABSTRACT

A device bootstrap method and a terminal configured to send a bootstrap request to a server, wherein the bootstrap request includes a node identifier (ID) and a transmission channel parameter of the terminal, receiving an acknowledgment message carrying a transmission channel selected by the server, where the transmission channel is determined based on the transmission channel parameter, receiving a temporary ID indication message including a temporary ID and a temporary key sent by a forwarding apparatus, where the forwarding apparatus is a network element that is configured to send a message to the terminal through the transmission channel selected by the server, and wherein the terminal is further configured to establish a secure communication channel with the server according to the temporary ID and the temporary key.

18 Claims, 9 Drawing Sheets

(51) Int. Cl.
*H04L 29/06* (2006.01)
*H04W 76/11* (2018.01)
*H04W 4/14* (2009.01)
*H04L 9/32* (2006.01)
*G16Y 10/75* (2020.01)

(52) U.S. Cl.
CPC ............. *H04W 76/11* (2018.02); *G16Y 10/75* (2020.01); *H04L 2463/141* (2013.01)

(58) Field of Classification Search
USPC ............................................................ 726/3
See application file for complete search history.

(56) References Cited

U.S. PATENT DOCUMENTS

| | | | |
|---|---|---|---|
| 2006/0196931 A1 | 9/2006 | Holtmanns et al. | |
| 2008/0074423 A1 | 3/2008 | Gan et al. | |
| 2009/0180614 A1* | 7/2009 | Rajagopal | H04N 7/17318 380/228 |
| 2009/0204997 A1* | 8/2009 | Xu | H04H 60/72 725/54 |
| 2011/0247031 A1* | 10/2011 | Jacoby | H04N 21/8166 725/25 |
| 2012/0276872 A1 | 11/2012 | Knauth et al. | |
| 2014/0141763 A1 | 5/2014 | Suh et al. | |
| 2014/0330952 A1 | 11/2014 | Starsinic et al. | |
| 2015/0326572 A1* | 11/2015 | Oyman | H04N 21/6175 726/4 |
| 2016/0295346 A1 | 10/2016 | Iwai et al. | |
| 2017/0195877 A1* | 7/2017 | Lehtovirta | H04W 4/50 |
| 2017/0295491 A1 | 10/2017 | Gehrmann | |
| 2018/0063697 A1* | 3/2018 | Li | H04W 8/183 |
| 2018/0070234 A1* | 3/2018 | Torvinen | H04W 12/0431 |
| 2018/0109418 A1* | 4/2018 | Cammarota | H04L 9/0827 |
| 2018/0152541 A1* | 5/2018 | Mathison | H04L 67/02 |
| 2018/0198763 A1* | 7/2018 | Bryson | H04W 12/04 |
| 2018/0270237 A1* | 9/2018 | Lewis | H04L 63/06 |
| 2018/0316673 A1* | 11/2018 | Shah | H04W 12/35 |
| 2018/0351967 A1* | 12/2018 | Jacobson | G06F 21/575 |
| 2019/0028474 A1* | 1/2019 | Chen | H04L 63/08 |
| 2019/0036896 A1* | 1/2019 | Khushu | H04L 9/3271 |
| 2019/0098498 A1* | 3/2019 | Badulescu | H04W 12/069 |
| 2019/0222615 A1 | 7/2019 | Starsinic et al. | |

FOREIGN PATENT DOCUMENTS

| | | |
|---|---|---|
| CN | 103051594 A | 4/2013 |
| CN | 104780536 A | 7/2015 |
| CN | 105379312 A | 3/2016 |
| JP | 2005525758 A | 8/2005 |
| JP | 2010504560 A | 2/2010 |
| JP | 2016527739 A | 9/2016 |
| KR | 20070110409 A | 11/2007 |
| KR | 20130006032 A | 1/2013 |
| WO | 2013171722 A2 | 11/2013 |
| WO | 2015075852 A1 | 5/2015 |

OTHER PUBLICATIONS

OMA-TS-LightweightM2M-V1_0-20170208-A Open Mobile Alliance ,"Lightweight Machine to Machine Technical Specification Approved Version 1.0" ,dated Feb. 8, 2017,total 138 pages.

* cited by examiner

DEVICE BOOTSTRAP METHOD, TERMINAL, AND SERVER

CROSS-REFERENCE TO RELATED APPLICATIONS

This application is a continuation of International Patent Application No. PCT/CN2018/123457, filed on Dec. 25, 2018, which claims priority to Chinese Patent Application No. 201711477985.7, filed on Dec. 29, 2017. The disclosures of the aforementioned applications are hereby incorporated by reference in their entireties.

TECHNICAL FIELD

This application relates to the communications field, and in particular, to a device bootstrap method, a terminal, and a server.

BACKGROUND

As Internet of things (IoT) technologies are widely used and vibrantly developed, ever-increasing terminals access the IoT. Therefore, provisioning for and management of the terminals are increasingly important. A bootstrap server (BS Server) helps simplify the process. The provisioning for the terminals includes information such as identifier (ID) information, service subscription information, and a target platform address.

Existing over-the-air (OTA) modes may include a client initial bootstrap mode and a server initial bootstrap mode. The client initial bootstrap mode is used as an example for description. The BS server is usually deployed on a public network, and an IoT platform is a destination platform to which a terminal is to be connected. The public network is a common circuit switched network, namely, a backbone network and a branch network built by China Netcom, China Telecom, China Tie Tong Telecom, or the like.

A unique ID for checking the terminal by the BS server is a node ID (an end point name). The end point name is usually physical hardware ID information of the terminal, such as a media access control (MAC) address, an International Mobile Equipment ID (IMEI), or a personal identification number (PIN) code, has low strength, and may be maliciously inferred by a user massive times. In addition, information such as a key transmitted by the BS server to the terminal belongs to sensitive information, and there is a leakage risk during plaintext transmission on the public network.

SUMMARY

Embodiments of this application provide a device bootstrap method, to improve security of transmitting and bootstrapping related data between a terminal and a server.

In view of this, a first aspect of the embodiments of this application provides a device bootstrap method. The method may include sending a second bootstrap request to a server, where the second bootstrap request includes a node ID and a transmission channel parameter of the terminal, and the transmission channel parameter is used to indicate a transmission channel supported by a terminal, and the terminal receives a second acknowledgment message that is sent by the server according to the second bootstrap request, where the second acknowledgment message carries a transmission channel selected by the server based on the transmission channel parameter. It may be understood that the transmission channel selected by the server herein may be an ID, indication information, another parameter, or the like and is used to indicate that the terminal can receive, through the transmission channel selected by the server, the message sent by the server. The terminal receives a temporary ID indication message sent by a forwarding apparatus, where the temporary ID indication message includes a temporary ID and a temporary key, and the forwarding apparatus is a network element that is configured to send a message to the terminal through the transmission channel selected by the server. It should be noted that a trusted communication channel is established between the forwarding apparatus and the terminal. The terminal may send a connection request to the server based on the temporary ID and the temporary key, where the connection request is used to request to establish a secure channel with the server.

In this embodiment of this application, the terminal receives the temporary ID and the temporary key that are sent by the forwarding apparatus, and may initiate the connection request to the server using the temporary ID and the temporary key, where the connection request is used to establish the secure channel with the server, and then transmission between the terminal and the server is performed through the secure channel. Therefore, security of transmitting and bootstrapping related data can be improved.

Optionally, in some embodiments of this application, the transmission channel selected by the server includes a device trigger transmission channel, the temporary ID includes a pre-shared key identifier (PSKID), and the temporary key includes a pre-shared key (PSK). That the terminal receives a temporary ID indication message sent by a forwarding apparatus may include receiving, through the device trigger transmission channel, a trigger request sent by a machine type communication interworking function (MTC-IWF) network element, where the trigger request includes the P SKID and the PSK. That is, a channel through which the terminal receives the trigger request sent by the forwarding apparatus is the device trigger transmission channel, and the forwarding apparatus herein is the MTC-IWF network element. Communication between the terminal and the MTC-IWF network element is usually internal communication on a 3rd Generation Partnership Project (3GPP) network. Therefore, reliability is relatively high.

Optionally, in some embodiments of this application, the transmission channel selected by the server includes a short message service transmission channel, the temporary ID includes a PSKID, and the temporary key includes a PSK. That the terminal receives a temporary ID indication message sent by a forwarding apparatus may include receiving, through the short message service transmission channel, a mobile terminated short message service (MT SMS) message sent by the short message service center (SMSC) network element, where the MT SMS message includes the PSKID and the PSK. That is, a channel through which the terminal receives the trigger request sent by the forwarding apparatus is the short message service transmission channel, and the forwarding apparatus herein is the SMSC network element. Communication between the terminal and the SMSC network element is usually internal communication on a 3GPP network. Therefore, reliability is relatively high.

Optionally, in some embodiments of this application, the transmission channel selected by the server includes a data transmission channel, the temporary ID includes a PSKID, and the temporary key includes a PSK. That the terminal receives a temporary ID indication message sent by a forwarding apparatus may include receiving, through the data transmission channel, a non-Internet Protocol (IP)

packet header data delivery message sent by a service creation environment function (SCEF) network element, where the non-IP packet header data delivery message includes the PSKID and the PSK. That is, a channel through which the terminal receives the trigger request sent by the forwarding apparatus is the data transmission channel, and the forwarding apparatus herein is the SCEF network element. Communication between the terminal and the SCEF network element is usually internal communication on a 3GPP network. Therefore, reliability is relatively high.

Optionally, in some embodiments of this application, the second bootstrap request may further include a security parameter, where the security parameter is obtained by the terminal using a first bootstrap request. Before a terminal sends a second bootstrap request to a server, the method may further include sending the first bootstrap request to the server, where the first bootstrap request includes the node ID and the transmission channel parameter of the terminal, and the terminal receives a first acknowledgment message that is sent by the server according to the first bootstrap request, where the first acknowledgment message carries the security parameter. That the terminal sends the first bootstrap request to the server may notify the server of the node ID and the transmission channel parameter of the terminal. Then, the server may determine ID information of the terminal, and performs security authentication. Therefore, a security assurance for subsequent communication between the terminal and the server is provided.

Optionally, in some embodiments of this application, after the terminal sends a connection request to the server based on the temporary ID and the temporary key, where the connection request is used to request to establish a secure channel with the server, the method may further include sending a third bootstrap request to the server through the secure channel, where the third bootstrap request includes the node ID of the terminal, and the terminal receives, through the secure channel, device management (DM) information that is sent by the server according to the third bootstrap request. That is, after the terminal establishes the secure channel with the server, the terminal may send the third bootstrap request to the server. The third bootstrap request is used to request the server to deliver the device security management message.

Optionally, in some embodiments of this application, after the terminal receives, through the secure channel, DM information that is sent by the server according to the third bootstrap request, the method further includes sending a registration request and service data to an IoT platform based on the DM information.

Optionally, in some embodiments of this application, the second acknowledgment message further carries a hold on timer parameter, and the terminal receives a temporary ID indication message sent by a forwarding apparatus may include the terminal receives within a preset time based on the hold on timer parameter, the temporary ID indication message sent by the forwarding apparatus. That is, the terminal may receive, in a timely manner based on the hold on timer parameter, the temporary ID indication message sent by the server.

A second aspect of the embodiments of this application provides a device bootstrap method. The method may include receiving a second bootstrap request sent by a terminal, where the second bootstrap request includes a node ID and a transmission channel parameter of the terminal, and the transmission channel parameter is used to indicate a transmission channel supported by the terminal, and determining a forwarding apparatus based on the node ID and the transmission channel parameter, and sends a second acknowledgment message to the terminal, where the second acknowledgment message carries a transmission channel selected by the server, and the transmission channel selected by the server is used to indicate that the terminal receives, through the transmission channel selected by the server, a message sent by the server. It may be understood that the transmission channel herein may be an ID, indication information, another parameter, or the like and is used to indicate that the terminal can receive, through the transmission channel selected by the server, the message sent by the server. It should be noted that a trusted communication channel is established between the forwarding apparatus and the terminal. The server sends a temporary ID indication message to the forwarding apparatus, where the temporary ID indication message includes a temporary ID and a temporary key, and the temporary ID and the temporary key are used by the terminal to initiate a connection request. The server receives the connection request sent by the terminal. The server establishes a secure channel with the terminal according to the connection request.

In this embodiment of this application, the server sends the temporary ID and the temporary key to the terminal using the forwarding apparatus. After receiving the temporary ID and the temporary key, the terminal may initiate the connection request to the server using the temporary ID and the temporary key, where the connection request is used to establish the secure channel with the server, and then transmission between the terminal and the server is performed through the secure channel. Therefore, security of transmitting and bootstrapping related data can be improved.

Optionally, in some embodiments of this application, the transmission channel selected by the server includes a device trigger transmission channel, the temporary ID includes a PSKID, and the temporary key includes a PSK. That the server sends a temporary ID indication message to a forwarding apparatus may include the server sends, through the device trigger transmission channel, a trigger request to a MTC-IWF network element, where the trigger request includes the PSKID and the PSK. That is, a channel through which the server sends the trigger request to the forwarding apparatus is the device trigger transmission channel, and the forwarding apparatus herein is the MTC-IWF network element. Communication between the MTC-IWF network element and the server is usually based on a Representational state transfer (RESTful) interface, and based on hypertext transfer protocol secure (HTTPS). Encryption and integrity protection are performed during communication transmission to ensure reliability of data transmission between the terminal and the server.

Optionally, in some embodiments of this application, the transmission channel selected by the server includes a short message service transmission channel, the temporary ID includes a PSKID, and the temporary key includes a PSK. That the server sends a temporary ID indication message to a forwarding apparatus may include the server sends, through the short message service transmission channel, a MT SMS message to a SMSC network element, where the MT SMS message includes the PSKID and the PSK. That is, a channel through which the server sends the trigger request to the forwarding apparatus is the device trigger transmission channel, and the forwarding apparatus herein is the SMSC network element. Communication between the SMSC network element and the server is usually based on a RESTful interface, and based on HTTPS. Encryption and integrity protection are performed during communication transmission to ensure reliability of data transmission between the terminal and the server.

Optionally, in some embodiments of this application, the transmission channel selected by the server includes a data transmission channel, the temporary ID includes a PSKID, and the temporary key includes a PSK. That the server sends a temporary ID indication message to a forwarding apparatus may include the server sends, through the data transmission channel, a non-IP packet header data delivery message to a SCEF network element, where the non-IP packet header data delivery message includes the PSKID and the PSK. That is, a channel through which the server sends the trigger request to the forwarding apparatus is the data transmission channel, and the forwarding apparatus herein is the SCEF network element. Communication between the SCEF network element and the server is usually based on a RESTful interface, and based on HTTPS. Encryption and integrity protection are performed during communication transmission to ensure reliability of data transmission between the terminal and the server.

Optionally, in some embodiments of this application, the second bootstrap request further includes a security parameter. The security parameter is obtained by the terminal using a first bootstrap request. Before a server receives a second bootstrap request sent by a terminal, the method may further include the server receives the first bootstrap request sent by the terminal, where the first bootstrap request includes the node ID and the transmission channel parameter of the terminal, and the server sends a first acknowledgment message to the terminal based on the node ID and the transmission channel parameter of the terminal, where the first acknowledgment message carries the security parameter, and the security parameter is used by the terminal to prevent a denial-of-service (DOS) attack. The server receives the first bootstrap request sent by the terminal. The server may learn the node ID and the transmission channel parameter of the terminal. Then, the server may determine ID information of the terminal, and performs security authentication. Therefore, a security assurance for subsequent communication between the terminal and the server is provided.

Optionally, in some embodiments of this application, after the server establishes the secure channel with the terminal according to the connection request, the method may further include the server receives a third bootstrap request sent by the terminal, where the third bootstrap request includes the node ID of the terminal, and the server sends DM information to the terminal based on the node ID of the terminal. That is, after the terminal establishes the secure channel with the server, the terminal may send the third bootstrap request to the server. The third bootstrap request is used to request the server to deliver the device security management message.

Optionally, in some embodiments of this application, the second acknowledgment message further carries a hold on timer parameter. The hold on timer parameter is used to indicate that the terminal does not enter a hibernated state within a preset time. In this way, the terminal receives, in a timely manner within the preset time, the temporary ID indication message delivered by the server.

A third aspect of the embodiments of this application provides a terminal, having a function of improving security of transmitting and bootstrapping related data. The function may be implemented by hardware, or may be implemented by hardware by executing corresponding software. The hardware or software includes one or more modules corresponding to the foregoing function.

A fourth aspect of the embodiments of this application provides a server, having a function of improving security of transmitting and bootstrapping related data. The function may be implemented by hardware, or may be implemented by hardware by executing corresponding software. The hardware or software includes one or more modules corresponding to the foregoing function.

A fifth aspect of the embodiments of this application provides a terminal. The terminal may include one or more processors, a memory, a plurality of application programs, and one or more computer programs. The one or more computer programs are stored in the memory. The one or more computer programs include an instruction, and when the instruction is executed by the terminal, the terminal is enabled to perform the method according to any one of the first aspect or the optional manners of the first aspect of the embodiments of this application.

A sixth aspect of the embodiments of this application provides a server. The server may include one or more processors, a memory, a plurality of application programs, and one or more computer programs. The one or more computer programs are stored in the memory. The one or more computer programs include an instruction, and when the instruction is executed by the server, the server is enabled to perform the method according to any one of the second aspect or the optional manners of the second aspect of the embodiments of this application.

A seventh aspect of the embodiments of this application provides a wireless communications apparatus. The wireless communications apparatus may include at least one processor, a memory, a transceiver circuit, and a bus system. The processor, the memory, and the transceiver circuit are coupled using the bus system. The wireless communications apparatus communicates with a server using the transceiver circuit. The memory is configured to store a program instruction. The at least one processor is configured to execute the program instruction stored in the memory. The wireless communications apparatus is enabled to perform the operation part performed by the terminal in the method according to any one of the first aspect or the optional manners of the first aspect of the embodiments of this application. The wireless communications apparatus may be a terminal, or may be a system chip that is applied to a terminal and that performs a corresponding function.

An eighth aspect of the embodiments of this application provides a wireless communications apparatus. The wireless communications apparatus may include at least one processor, a memory, a transceiver circuit, and a bus system. The processor, the memory, and the transceiver circuit are coupled using the bus system. The wireless communications apparatus communicates with a server using the transceiver circuit. The memory is configured to store a program instruction. The at least one processor is configured to execute the program instruction stored in the memory. The wireless communications apparatus is enabled to perform the operation part performed by the server in the method according to any one of the second aspect or the optional manners of the second aspect. The wireless communications apparatus may be a server, or may be a system chip that is applied to a server and that performs a corresponding function.

A ninth aspect of the embodiments of this application provides a storage medium. It should be noted that the technical solutions of this application essentially, or the part contributing to other approaches, or all or some of the technical solutions may be implemented in a form of a software product. The computer software product is stored in the storage medium, and the computer software product is configured to store a computer software instruction used by the foregoing terminal. The computer software instruction includes a program executed by and designed for the terminal in the first aspect. Alternatively, the computer software product is configured to store a computer software instruction used by the foregoing server. The computer software instruction includes a program executed by and designed for the server in the second aspect.

The storage medium includes various media that may store program code, such as a USB flash drive, a removable hard disk, a read-only memory (ROM), a random access memory (RAM), a magnetic disk, or an optical disc.

A tenth aspect of the embodiments of this application provides a computer program product including an instruction. When the instruction is run on a terminal, the terminal is enabled to perform the method in the first aspect or any optional implementation of the first aspect in this application.

An eleventh aspect of the embodiments of this application provides a computer program product including an instruction. When the instruction is run on a server, the server is enabled to perform the method in the second aspect or any optional implementation of the second aspect in this application.

It can be learned from the foregoing technical solutions that, the embodiments of this application have the following benefits.

In the embodiments of this application, the terminal sends the second bootstrap request to the server, where the second bootstrap request includes the node ID and the transmission channel parameter of the terminal, and the transmission channel parameter is used to indicate the transmission channel supported by the terminal, the terminal receives the second acknowledgment message that is sent by the server according to the second bootstrap request, where the second acknowledgment message carries the transmission channel selected by the server, and the transmission channel selected by the server is determined by the server based on the transmission channel parameter, the terminal receives the temporary ID indication message sent by the forwarding apparatus, where the temporary ID indication message includes the temporary ID and the temporary key, and the forwarding apparatus is the network element that is configured to send a message to the terminal through the transmission channel selected by the server, and the terminal sends the connection request to the server based on the temporary ID and the temporary key, where the connection request is used to request to establish the secure channel with the server. In an embodiment, the terminal receives the temporary ID and the temporary key that are sent by the forwarding apparatus, and may initiate the connection request using the temporary ID and the temporary key, where the connection request is used to establish the secure channel with the server, and then transmission between the terminal and the server is performed through the secure channel. Therefore, security of transmitting and bootstrapping the related data can be improved.

BRIEF DESCRIPTION OF DRAWINGS

To describe the technical solutions in the embodiments of this application more clearly, the following briefly describes the accompanying drawings required for describing other approaches or the embodiments. Apparently, the accompanying drawings described in the following show merely some embodiments of this application, and another drawing may still be derived from these accompanying drawings.

DESCRIPTION OF EMBODIMENTS

Figure 1:
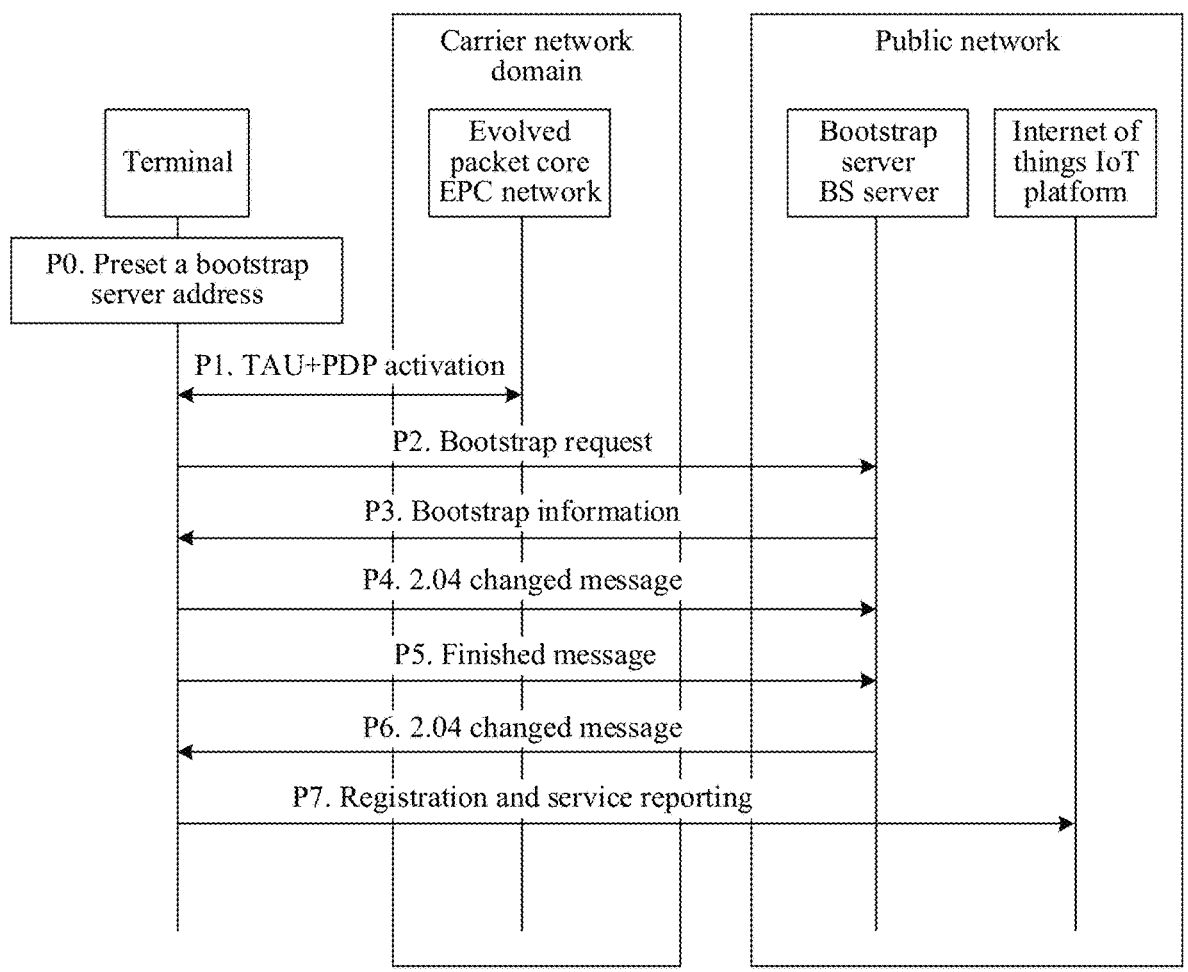
FIG. 1 is a schematic diagram of a procedure of a bootstrap mode on an existing IoT network.

Embodiments of this application provide a device bootstrap method, to improve security of transmitting and bootstrapping related data between a terminal and a server.

To make persons skilled in the art understand the solutions in this application better, the following describes the technical solutions in the embodiments of this application with reference to the accompanying drawings in the embodiments of this application. Apparently, the described embodiments are merely some rather than all of the embodiments of this application. All the embodiments based on this application shall fall within the protection scope of this application.

In an existing DM protocol, a bootstrap procedure usually includes the following several modes.

(1) Factory Bootstrap Mode.

In this mode, a terminal vendor directly presets related DM information of a terminal before delivery of the terminal. The DM information may include parameters such as a terminal ID, a key, an address of a connected destination service platform, subscribed service information, and configuration information, where the terminal key and the subscribed service information belong to sensitive data.

However, this bootstrap mode is not flexible enough, increases production workload of the terminal vendor, and raises a high capability requirement for production and delivery according to an order. The terminal vendor and an application vendor have a trust relationship. The application vendor may need to re-modify sensitive information such as an initial key after the terminal gets online.

(2) Bootstrap from Smartcard Mode.

In this mode, a smartcard stores DM information, and the DM information is read and used by a terminal through a secure channel between the smartcard and the terminal, where the DM information may be preset by a card vendor. The terminal reads the DM information from the smartcard, and then connects to a destination service platform to carry out a service. In this mode, the card vendor needs to provision the DM information to the smartcard according to an order in advance, and therefore this mode has a relatively high security degree. The smartcard may further include a subscriber identity module (SIM) card, and the like.

This bootstrap mode raises a requirement for the card vendor, that is, requires strong cooperation between an application vendor and the card vendor. However, the application vendor usually does not directly cooperate with the card vendor. In other words, this bootstrap mode raises requirements for the card and the terminal.

(3) Client Initial Bootstrap Mode.

A terminal proactively initiates a bootstrap request to a BS server, and the BS server returns DM information of the terminal based on hardware information of the terminal. The hardware information of the terminal may include a MAC address, an IMEI, a PIN code, and the like. The DM information of the terminal may include parameters such as a terminal ID, a key, an address of a connected destination service platform, subscribed service information, and configuration information.

(4) Server Initial Bootstrap Mode.

A BS Server automatically delivers DM information to a terminal, and the terminal initiates a connection and service request to a destination service platform based on the delivered DM information. The DM information may include parameters such as a terminal ID, a key, an address of a connected destination service platform, subscribed service information, and configuration information.

Both the client initial bootstrap mode and the server initial bootstrap mode are OTA modes. However, the OTA mode is not secure enough. If sensitive information is transmitted in plaintext on a network, there is a leakage risk. When the terminal initially requests BS information, there is only an end point name parameter of the terminal. Consequently, there is a risk of maliciously forging the terminal.

FIG. 1 is a schematic diagram of a procedure of a bootstrap mode on an existing IoT network. As shown in FIG. 1, specific steps of the procedure are as follows.

P0. Preset a BS server address of a public network for UE before delivery of the UE. The address is an address of the public network, may be globally unique or unique in an area, and is non-differentiated data for a terminal vendor.

P1. The terminal is powered on, then initiates a tracking area update (TAU) and Packet Data Protocol (PDP) activation in a network.

P2. The terminal initiates a bootstrap request to a BS server, where the bootstrap request message carries a node name (an end point name) of the terminal.

P3. The BS server returns DM information of the terminal based on the end point name. In P3, a plurality of pieces of DM information may be returned, and the DM information includes a terminal ID, a key, subscribed service information, and the like.

P4. After receiving the DM information, the terminal stores the DM information and returns a 2.04 changed message to the BS server.

P5. After all DM information is sent to the terminal, the BS server sends a finished message to the terminal.

P6. The terminal returns the 2.04 changed message to the BS server.

P7. The terminal initiates service procedures such as registration and data reporting to a destination IoT platform (determines, according to an indication, whether to pre-establish a Datagram Transport Layer Security (DTLS) link.

Note the foregoing procedures and messages are based on a lightweight machine-to-machine (LWM2M) protocol of version 1.0.

The following roles are included in the foregoing procedure.

Smartcard vendor. A smartcard vendor produces a card, writes DM information into the card, and sells the smartcard to a device manufacturer.

Device manufacturer. A device manufacturer produces a device. In an embodiment, the device manufacturer purchases production data such as a smartcard in advance, writes DM information into the device, and sells the smartcard to an application service provider.

Application service provider. An application service provider is a real owner of a device, and may change DM information.

In conclusion, from a perspective of an end to end (E2E) procedure, an OTA mode is a flexible bootstrap mode. However, security of the OTA mode needs to be improved. This application provides a secure OTA bootstrap solution, to meet flexible service provisioning and DM requirements.

Figure 2:
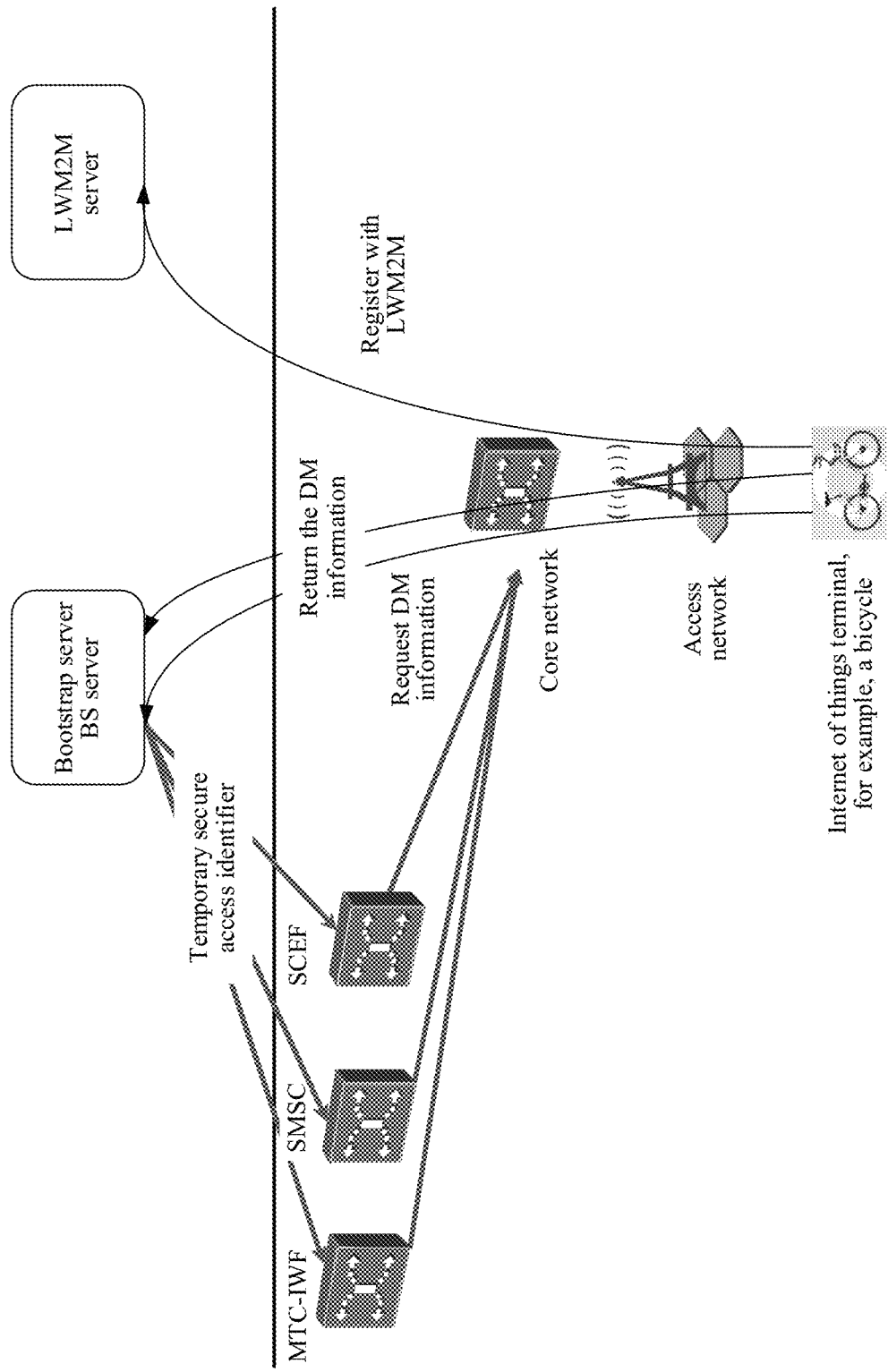
FIG. 2 is an architectural diagram of a system that is applied to an embodiment of this application.

FIG. 2 is an architectural diagram of a system that is applied to an embodiment of this application. A terminal requests BS information from a BS server through an access network and a core network. The BS server also returns the BS information to the terminal through the core network and the access network. The BS server may invoke a capability of a MTC-IWF network element, a SMSC network element, or a SCEF network element in the core network to send a temporary ID indication message to the terminal, where the temporary ID indication message is used by the terminal to perform temporary access. Then, the terminal initiates a registration procedure to an LWM2M through the access network and the core network based on the temporary ID indication message.

Figure 3:
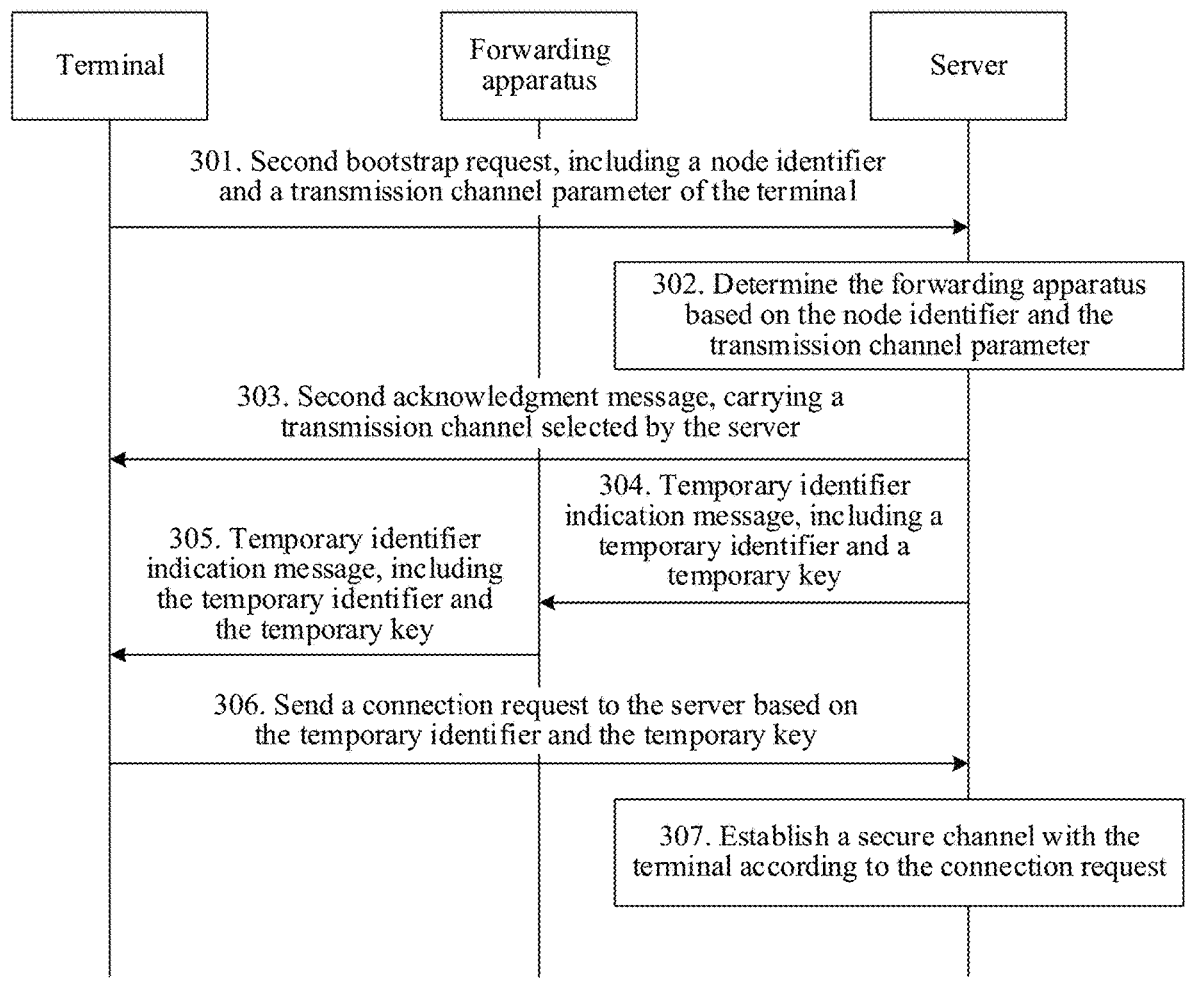
FIG. 3 is a schematic diagram of an embodiment of a device bootstrap method according to an embodiment of this application.

FIG. 3 is a schematic diagram of an embodiment of a device bootstrap method according to an embodiment of this application.

301. A terminal sends a second bootstrap request to a server, where the second bootstrap request includes a node ID and a transmission channel parameter of the terminal.

The server receives the second bootstrap request sent by the terminal. The second bootstrap request carries the node ID and the transmission channel parameter. The transmission channel parameter may include information such as a user equipment mobile terminated (UE MT) channel capability parameter, and the transmission channel parameter is used to indicate a transmission channel supported by the terminal.

It may be understood that the UE MT channel capability parameter represents a capability supported by the terminal on a 3GPP network, for example, a device trigger capability, a MT SMS capability, and a mobile terminated non-IP mobile terminated Non-IP data delivery (MT NIDD) capability such that the BS server selects a specific channel for addressing the terminal.

It should be noted that a node ID (which may also be referred to as an end point name) of a terminal and a mapping relationship between the node ID of the terminal and an ID of the terminal on the 3GPP network are preset on the BS server. For example, the ID on the 3GPP network may include a parameter such as a mobile station integrated services digital network number (MSISDN) and an external ID beyond the 3GPP network, and is used for addressing the terminal.

The node ID of the terminal may further include a MAC address, an IMEI, a PIN code, a serial number (SN), and the like.

302. The server determines a forwarding apparatus based on the node ID and the transmission channel parameter.

The server determines the forwarding apparatus based on the node ID and the transmission channel parameter. If the transmission channel parameter is a device trigger capability parameter, the forwarding apparatus determined by the server is a MTC-IWF network element, and the transmission channel parameter is a device trigger channel parameter. If the transmission channel parameter is a MT SMS capability parameter, the forwarding apparatus determined by the server is a SMSC network element, and the transmission channel parameter is a MT SMS channel parameter. If the transmission channel parameter is a non-IP packet header data delivery capability parameter, the forwarding apparatus determined by the server is a SCEF network element, and the transmission channel parameter is a non-IP packet header data delivery channel parameter.

Optionally, the server may determine, based on the node ID, the transmission channel parameter, channel information supported by the server, channel service quality, and the like, a transmission channel selected by the server, and notify the terminal of the transmission channel selected by the server such that the terminal knows to receive, through the transmission channel selected by the server, a message sent by the server. The transmission channel selected by the server may include a device trigger (device trigger) channel, a MT SMS channel, a MT NIDD channel, and the like. In other words, the transmission channel corresponds to the forwarding apparatus determined by the server.

303. The server sends a second acknowledgment message to the terminal, where the second acknowledgment message carries the transmission channel selected by the server.

If the BS server checks that the node ID is correct, the BS server returns the second acknowledgement (ACK) message to the terminal, where the second ACK message carries the transmission channel selected by the server, and the transmission channel selected by the server may include a selected mobile terminated channel (selected MT channel) parameter. The terminal receives the second acknowledgment message that is sent by the server according to the second bootstrap request, where the second acknowledgment message carries the transmission channel selected by the server.

Optionally, the second acknowledgment message may further carry a client hold on timer parameter. The client hold on timer parameter is used to indicate that the terminal does not enter a hibernated state within a preset time. If the preset time expires, the terminal initiates a registration procedure or the like to the server.

304. The server sends a temporary ID indication message to the forwarding apparatus, where the temporary ID indication message includes a temporary ID and a temporary key, and the temporary ID and the temporary key are used by the terminal to initiate a connection request.

The forwarding apparatus receives the temporary ID indication message sent by the server. For example, the temporary ID may include a P SKID, and the temporary key may include a PSK parameter and the like.

It should be noted that communication between the terminal and the forwarding apparatus is usually internal communication on the 3GPP network. Therefore, reliability is relatively high. The forwarding apparatus usually communicates with the server through a RESTful interface based on HTTPS, and encryption and integrity protection are performed during communication transmission. Therefore, reliability is relatively high.

305. The forwarding apparatus sends the temporary ID indication message to the terminal, where the temporary ID indication message includes the temporary ID and the temporary key.

The terminal receives the temporary ID indication message sent by the forwarding apparatus. The temporary ID indication message includes the temporary ID and the temporary key. The forwarding apparatus is a network element determined by the server based on the node ID and the transmission channel parameter of the terminal, and a trusted communication channel is established between the forwarding apparatus and the terminal. Optionally, the receiving, by the terminal, the temporary ID indication message sent by the forwarding apparatus may include receiving, by the terminal within the preset time based on the hold on timer parameter, the temporary ID indication message sent by the forwarding apparatus.

306. The terminal sends the connection request to the server based on the temporary ID and the temporary key, where the connection request is used to request to establish a secure channel with the server.

For example, the terminal initiates a DTLS connection procedure to the BS server using the temporary P SKID and the PSK parameter.

307. The server establishes the secure channel with the terminal according to the transport layer connection request.

The server establishes the secure channel with the terminal according to the transport layer connection request. In this case, the server completes authentication on the terminal and establishment of a secure link. Though a terminal maliciously forges the node ID, the device trigger message is finally sent to the real terminal associated with the node ID because the ID on the 3GPP network cannot be forged, the malicious terminal cannot obtain the temporary PSKID and the PSK parameter, and a DTLS link cannot be established. The secure channel is used to transmit and bootstrap related data between the terminal and the server.

In this embodiment of this application, the terminal may initiate the connection request to the server based on the temporary ID indication message sent by the forwarding apparatus, where the connection request is used to request to establish the secure channel with the server, and then the terminal and the server can transmit and bootstrap the related data through the secure channel. Therefore, security of transmitting and bootstrapping the related data is improved.

Figure 4:
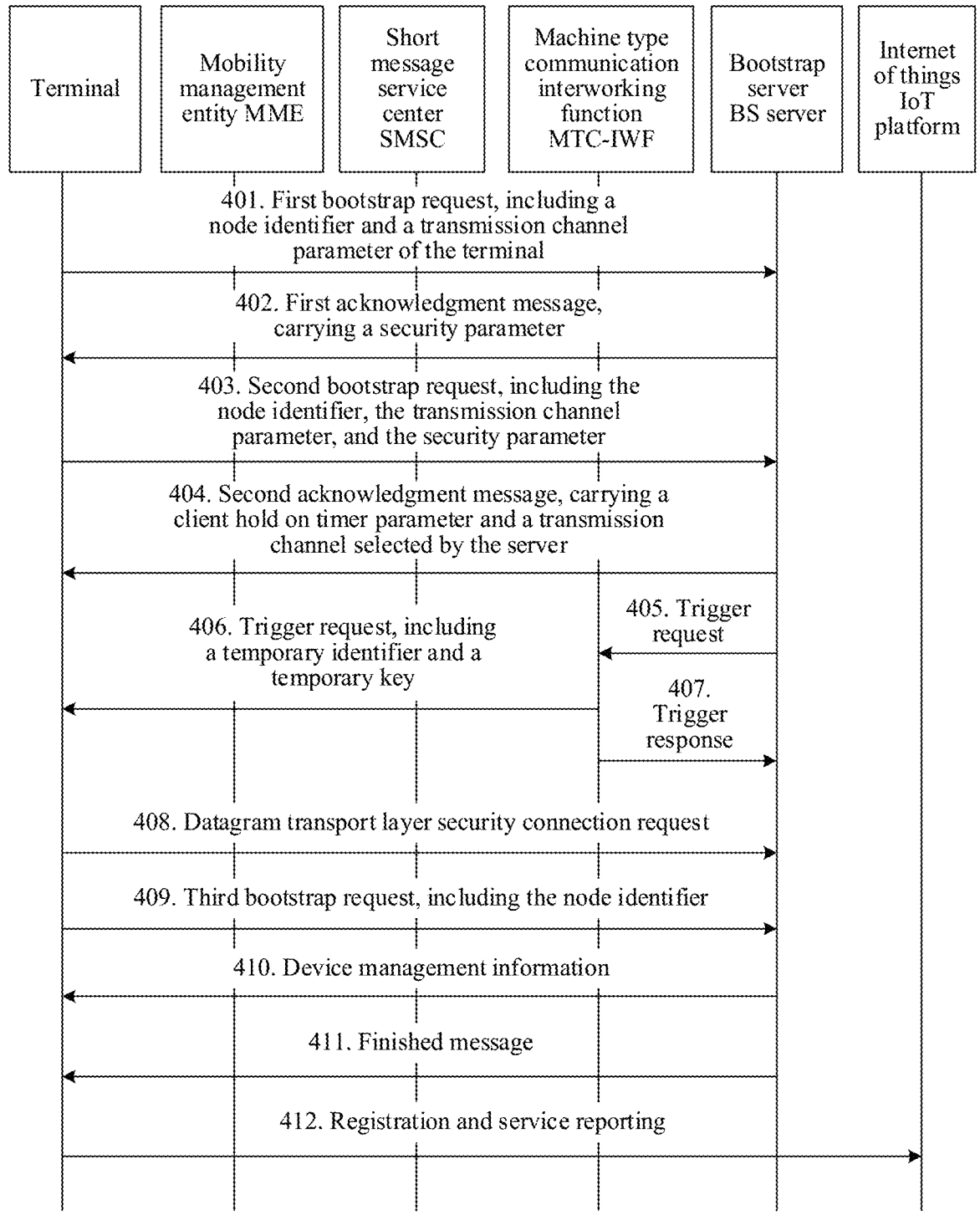
FIG. 4 is a schematic diagram of another embodiment of a device bootstrap method according to an embodiment of this application.

FIG. 4 is a schematic diagram of an embodiment of a device bootstrap method according to an embodiment of this application.

401. A terminal sends a first bootstrap request to a server, where the first bootstrap request includes a node ID and a transmission channel parameter of the terminal.

In this embodiment of this application, the server herein may be described using a BS server as an example. The terminal may initiate the first bootstrap request (bootstrap request) to the BS server on a public network, where the first bootstrap request carries the node ID and the transmission channel parameter. The transmission channel parameter may include information such as a UE MT channel capability (channel capability) parameter.

It may be understood that the UE MT channel capability parameter represents a capability supported by the terminal on a 3GPP network, for example, a device trigger capability, a MT SMS capability, and a mobile terminated non-IP MT NIDD capability such that the BS server selects a specific channel for addressing the terminal.

It should be noted that a node ID (which may also be referred to as an end point name) of a terminal and a mapping relationship between the node ID of the terminal and an ID of the terminal on the 3GPP network are preset on the BS server. For example, the ID on the 3GPP network may include a parameter such as a MSISDN and an external ID beyond the 3GPP network, and is used for addressing the terminal.

The node ID of the terminal may further include a MAC address, an IMEI, a PIN code, a SN, and the like.

402. The server sends a first ACK message to the terminal, where the first ACK message carries a security parameter.

The BS server may determine the corresponding ID of the terminal on the 3GPP network based on the node ID, and further determine, based on the UE MT channel capability parameter, a specific channel to address the UE. In an embodiment, the BS server may return the first ACK message to the terminal according to the first bootstrap request. The first ACK message carries the security parameter. For example, the security parameter may include a cookie parameter and the like. It may be understood that the security parameter is allocated by the BS server, and is used to prevent a DOS attack.

403. The terminal sends a second bootstrap request to the server, where the second bootstrap request includes the node ID, the transmission channel parameter of the terminal, and the security parameter.

The terminal reinitiates the second bootstrap request to the BS server. The second bootstrap request may carry the node ID, the UE MT channel capability parameter, and the security parameter that is just received from the BS server. The node ID and the UE MT channel capability parameter in this step are the same as those in step 301. The security parameter is used by the server to verify information, for example, determine whether the security parameter is a security parameter previously delivered by the server to the UE. If the security parameter is the security parameter previously delivered by the server to the UE, the server does not reject the second bootstrap request sent by the UE. If the security parameter is not the security parameter previously delivered by the server to the UE, the server may reject the second bootstrap request sent by the UE. For example, the security parameter may include a cookie parameter and the like.

404. The server sends a second ACK message to the terminal, where the second ACK message carries a client hold on timer parameter and a transmission channel selected by the server.

If the BS server checks that the security parameter and the node ID are correct, the BS server returns the second ACK message to the terminal. The second ACK message carries the client hold on timer parameter (indicating that the terminal does not enter a hibernated state within a specified time) and the transmission channel selected by the server. The transmission channel selected by the server may include information such as a selected MT channel parameter. A channel indicated by the transmission channel parameter may include a device trigger channel, a MT SMS channel, a MT NIDD channel, and the like. In this embodiment, the channel selected by the server is a device trigger channel. The client hold on timer parameter is an empirical value determined by the server.

405. The server sends a trigger request to a MTC-IWF network element, where the trigger request includes a temporary ID and a temporary key.

The BS server invokes, based on the ID of the terminal associated with the 3GPP network, a device trigger capability of the MTC-IWF network element, to initiate the trigger request to the terminal. The trigger request includes the temporary ID and the temporary key. For example, the temporary ID may include a PSKID, and the temporary key may include a PSK parameter and the like.

The PSKID and the PSK parameter that are carried in the trigger request are determined by the server based on the node ID reported by the terminal. It should be noted that communication between the terminal and the MTC-IWF network element is usually internal communication on the 3GPP network. Therefore, reliability is relatively high. The MTC-IWF network element usually communicates with the server through a RESTful interface based on HTTPS, and encryption and integrity protection are performed during communication transmission.

406. The MTC-IWF network element sends the trigger request to the terminal.

The MTC-IWF network element invokes an internal capability of the 3GPP network to complete a device trigger procedure, and sends the temporary PSKID and the PSK parameter to the terminal.

407. The MTC-IWF network element sends a device trigger response to the server.

After the MTC-IWF network element sends the trigger request to the terminal, the MTC-IWF network element sends the device trigger response to the BS server, to indicate, to the BS server, that the terminal is successfully woken up.

408. The terminal initiates a DTLS connection request to the server.

The terminal sends the connection request to the server based on the temporary ID and the temporary key. The server receives the connection request sent by the terminal, and the server establishes a secure channel with the terminal according to the connection request.

For example, the terminal initiates a DTLS connection procedure to the BS server using the temporary PSKID and the PSK parameter. In this case, the BS server completes authentication on the terminal and establishment of a secure link. (Though a terminal maliciously forges the node ID, the device trigger message is finally sent to the real terminal associated with the node ID because the ID on 3GPP cannot be forged, the malicious terminal cannot obtain the temporary PSKID and the PSK parameter, and a DTLS link cannot be established.)

409. The terminal sends a third bootstrap request to the server, where the third bootstrap request includes the node ID.

The terminal reinitiates the third bootstrap request to the BS server. The third bootstrap request carries the node ID. In this case, the third bootstrap request is transmitted through the secure channel.

410. The server sends DM information to the terminal.

The BS server delivers the DM information to the terminal. The DM information includes parameters such as an ID and a PSK that correspond to the terminal on a current platform accessed by the terminal. The step may be performed a plurality of times. If the terminal currently accesses a plurality of platforms, the BS server correspondingly sends a plurality of pieces of DM information to the terminal. Each piece of DM information includes parameters such as an ID and a PSK that correspond to the terminal on each platform accessed by the terminal.

411. The server sends a finished message to the terminal.

After the server completes delivering all DM information to the terminal, the BS server delivers the finished message to the terminal, and the current bootstrap procedure ends.

412. The terminal initiates registration and service reporting procedures to an IoT platform.

The terminal initiates procedures such as registration and service data reporting to the IoT platform based on the DM information.

In this embodiment of this application, though the terminal maliciously forges the node ID, the device trigger message is finally sent to the real terminal associated with the node ID because the ID on the 3GPP network cannot be forged, the malicious terminal cannot obtain the temporary PSKID and the PSK parameter, and the DTLS link cannot be established. Therefore, a secure bootstrap process is provided. The secure bootstrap process is imperceptible to a chip vendor, a module vendor, and a device vendor. An application vendor holds a real security credential, and the device vendor neither needs to add an additional manufacture operation, nor needs to support a delivery capability according to an order. Therefore, a supply chain design requirement for the device vendor is simplified.

When the terminal requests the server to provision the DM information, the server can verify, based on the associated ID of the terminal on the 3GPP network when the terminal registers an account in the BS server (the ID is set by an application server, and may be considered to be secure), whether the terminal is an authorized device, and send the temporary ID and the temporary key to the terminal through a 3GPP network channel. The terminal establishes a secure connection with the server using the temporary ID and the temporary key. The server returns sensitive data such as a real ID, a key, and subscribed service information based on the secure connection, to complete a data provisioning process. The temporary ID and the temporary key are released after current use.

Figure 5:
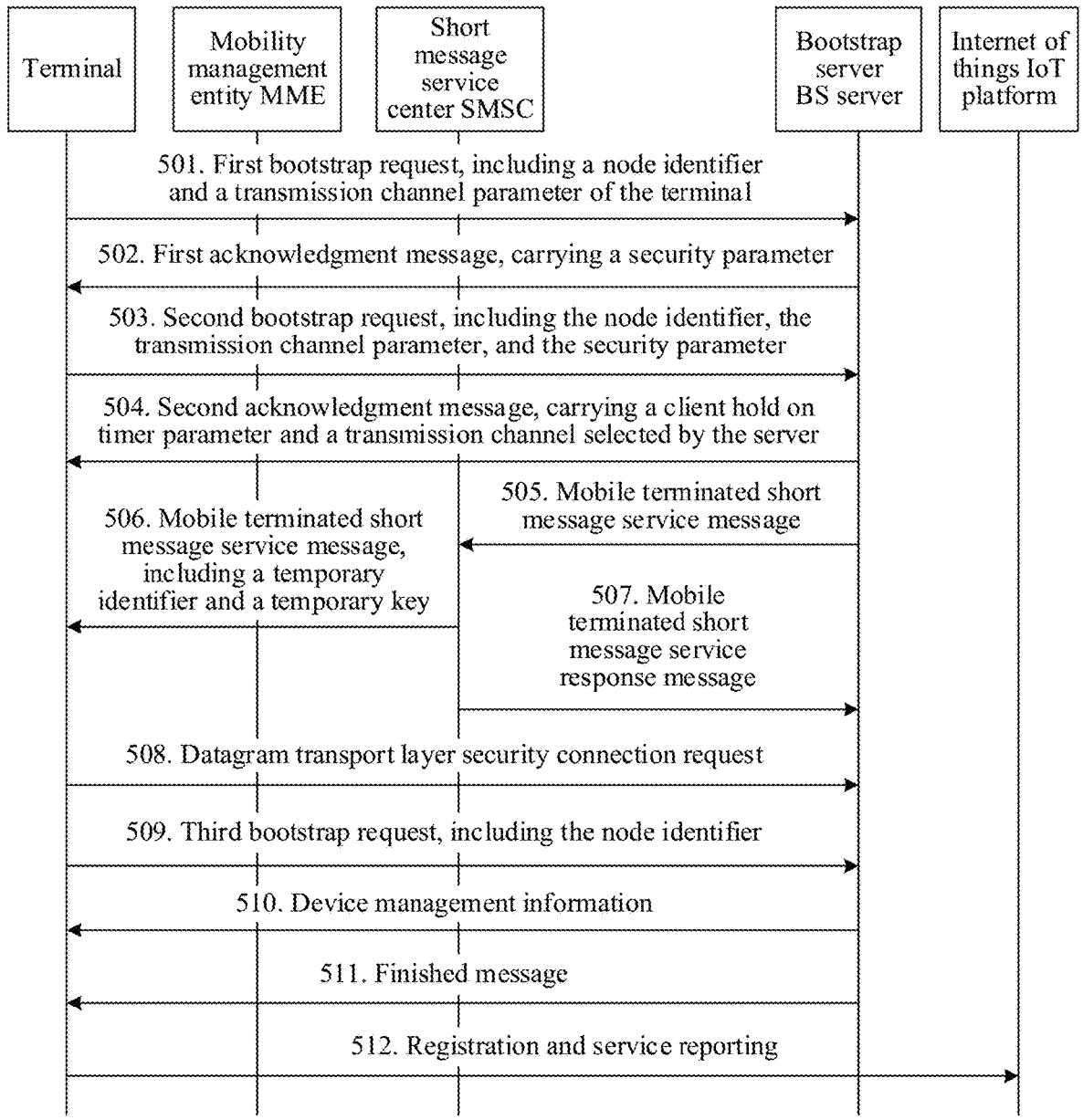
FIG. 5 is a schematic diagram of another embodiment of a device bootstrap method according to an embodiment of this application.

FIG. 5 is a schematic diagram of an embodiment of a device bootstrap method according to an embodiment of this application.

501. A terminal sends a first bootstrap request to a server, where the first bootstrap request includes a node ID and a transmission channel parameter of the terminal.

In this embodiment of this application, the server herein may be described using a BS server as an example. The terminal may initiate the first bootstrap request to the BS server on a public network, where the first bootstrap request carries the node ID and the transmission channel parameter. The transmission channel parameter may include information such as a UE MT channel capability parameter.

It may be understood that the UE MT channel capability parameter represents a capability supported by the terminal on a 3GPP network, for example, a device trigger capability, an MT SMS capability, and an MT NIDD capability such that the BS server selects a specific channel for addressing the terminal.

It should be noted that a node ID (also referred to as an end point name) of a device and a correspondence between the node ID of the terminal and an ID of the terminal on the 3GPP network are preset on the BS server. For example, the ID on the 3GPP network includes parameters such as an MSISDN and an external ID, and is used for addressing the terminal.

The node ID of the terminal may further include a MAC address, an IMEI, a PIN code, a SN, and the like.

502. The server sends a first ACK message to the terminal, where the first ACK message carries a security parameter.

The BS server may determine the corresponding ID of the terminal on the 3GPP network based on the node ID, and further determine, based on the UE MT channel capability parameter, a specific channel to address the UE. In an embodiment, the BS server may return the first ACK message to the terminal according to the first bootstrap request. The first ACK message carries the security parameter. For example, the security parameter may include a cookie parameter and the like. It may be understood that the security parameter is allocated by the BS server, and is used to prevent a DOS attack.

503. The terminal sends a second bootstrap request to the server, where the second bootstrap request includes the node ID, the transmission channel parameter of the terminal, and the security parameter.

The terminal reinitiates the second bootstrap request to the BS server. The second bootstrap request may carry the node ID, the UE MT channel capability, and the security parameter that is just received from the BS server. The node ID and the UE MT channel capability parameter in this step are the same as those in step 401. The security parameter is used by the server to verify information, for example, determine whether the security parameter is a security parameter previously delivered by the server to the UE. If the security parameter is the security parameter previously delivered by the server to the UE, the server does not reject the second bootstrap request sent by the UE. If the security parameter is not the security parameter previously delivered by the server to the UE, the server may reject the second bootstrap request sent by the UE. For example, the security parameter may include a cookie parameter and the like.

504. The server sends a second ACK message to the terminal, where the second ACK message carries a client hold on timer parameter and a transmission channel selected by the server.

If the BS server checks that the security parameter and the node ID are correct, the BS server returns the second ACK message to the terminal. The second ACK message carries the client hold on timer parameter (indicating that the terminal does not enter a hibernated state within a specified time) and the transmission channel selected by the server. The transmission channel selected by the server may include information such as a selected MT channel parameter. A channel indicated by the transmission channel parameter may include a device trigger channel, a MT SMS channel, a MT NIDD channel, and the like. In this embodiment, the channel selected by the server is a MT SMS channel. The client hold on timer parameter is an empirical value determined by the server.

505. The server sends a MT SMS message to an SMSC network element, where the MT SMS message includes a temporary ID and a temporary key.

The BS server invokes, based on the ID of the terminal associated with the 3GPP network, a MT SMS capability of the SMSC network element, to send the MT SMS message to the terminal. The MT SMS message includes the temporary ID and the temporary key. For example, the temporary ID may include a PSKID, and the temporary key may include a PSK parameter and the like.

The PSKID and the PSK parameter that are carried in the MT SMS message are determined by the server based on the node ID reported by the terminal. It should be noted that communication between the terminal and the SMSC network element is usually internal communication on the 3GPP network. Therefore, reliability is relatively high. The SMSC network element usually communicates with the server through a RESTful interface based on HTTPS, and encryption and integrity protection are performed during communication transmission.

506. The SMSC network element sends the MT SMS message to the terminal.

The SMSC network element invokes an internal capability of the 3GPP network to complete an MT SMS procedure, and sends the temporary PSKID and the PSK parameter to the terminal.

507. The SMSC network element sends a MT SMS response message to the server.

After the SMSC network element sends the MT SMS message to the terminal, the SMSC network element sends the MT SMS response message to the BS server, to indicate a sending success.

508. The terminal initiates a DTLS connection request to the server.

The terminal sends the connection request to the server based on the temporary ID and the temporary key. The server receives the connection request sent by the terminal, and the server establishes a secure channel with the terminal according to the connection request.

For example, the terminal initiates a DTLS connection procedure to the BS server using the temporary PSKID and the PSK parameter. In this case, the BS server completes authentication on the terminal and establishment of a secure link. (Though a terminal maliciously forges the node ID, the SMS message is finally sent to the real terminal associated with the node ID because the ID on 3GPP cannot be forged, the malicious terminal cannot obtain the temporary PSKID and the PSK parameter, and a DTLS link cannot be established.)

509. The terminal sends a third bootstrap request to the server, where the third bootstrap request includes the node ID.

The terminal reinitiates the third bootstrap request to the BS server. The third bootstrap request carries the node ID. In this case, the third bootstrap request is transmitted through the secure channel.

510. The server sends DM information to the terminal.

The BS server delivers the DM information to the terminal. The DM information includes parameters such as an ID and a PSK that correspond to the terminal on a current platform accessed by the terminal. The step may be performed a plurality of times. If the terminal currently accesses a plurality of platforms, the BS server correspondingly sends a plurality of pieces of DM information to the terminal. Each piece of DM information includes parameters such as an ID and a PSK that correspond to the terminal on each platform accessed by the terminal.

511. The server sends a finished message to the terminal.

After the server completes delivering all DM information to the terminal, the BS server delivers the finished message to the terminal, and the current bootstrap procedure ends.

512. The terminal initiates registration and service reporting procedures to an IoT platform.

The terminal initiates procedures such as registration and service data reporting to the IoT platform based on the DM information.

In this embodiment of this application, though the terminal maliciously forges the node ID, the SMS message is finally sent to the real terminal associated with the node ID because the ID on 3GPP cannot be forged, the malicious terminal cannot obtain the temporary PSKID and the PSK parameter, and the DTLS link cannot be established. Therefore, a secure bootstrap process is provided. The secure bootstrap process is imperceptible to a chip vendor, a module vendor, and a device vendor. An application vendor holds a real security credential, and the device vendor neither needs add an additional manufacture operation, nor needs to support a delivery capability according to an order. Therefore, a supply chain design requirement for the device vendor is simplified.

When the terminal requests the server to provision the DM information, the server can verify, based on the associated ID of the terminal on the 3GPP network when the terminal registers an account in the BS server (the ID is set by an application server, and may be considered to be secure), whether the terminal is an authorized device, and send the temporary ID and the temporary key to the terminal through a 3GPP network channel. The terminal establishes a secure connection with the server using the temporary ID and the temporary key. The server returns sensitive data such as a real ID, a key, and subscribed service information based on the secure connection, to complete a data provisioning process. The temporary ID and the temporary key are released after current use.

Figure 6:
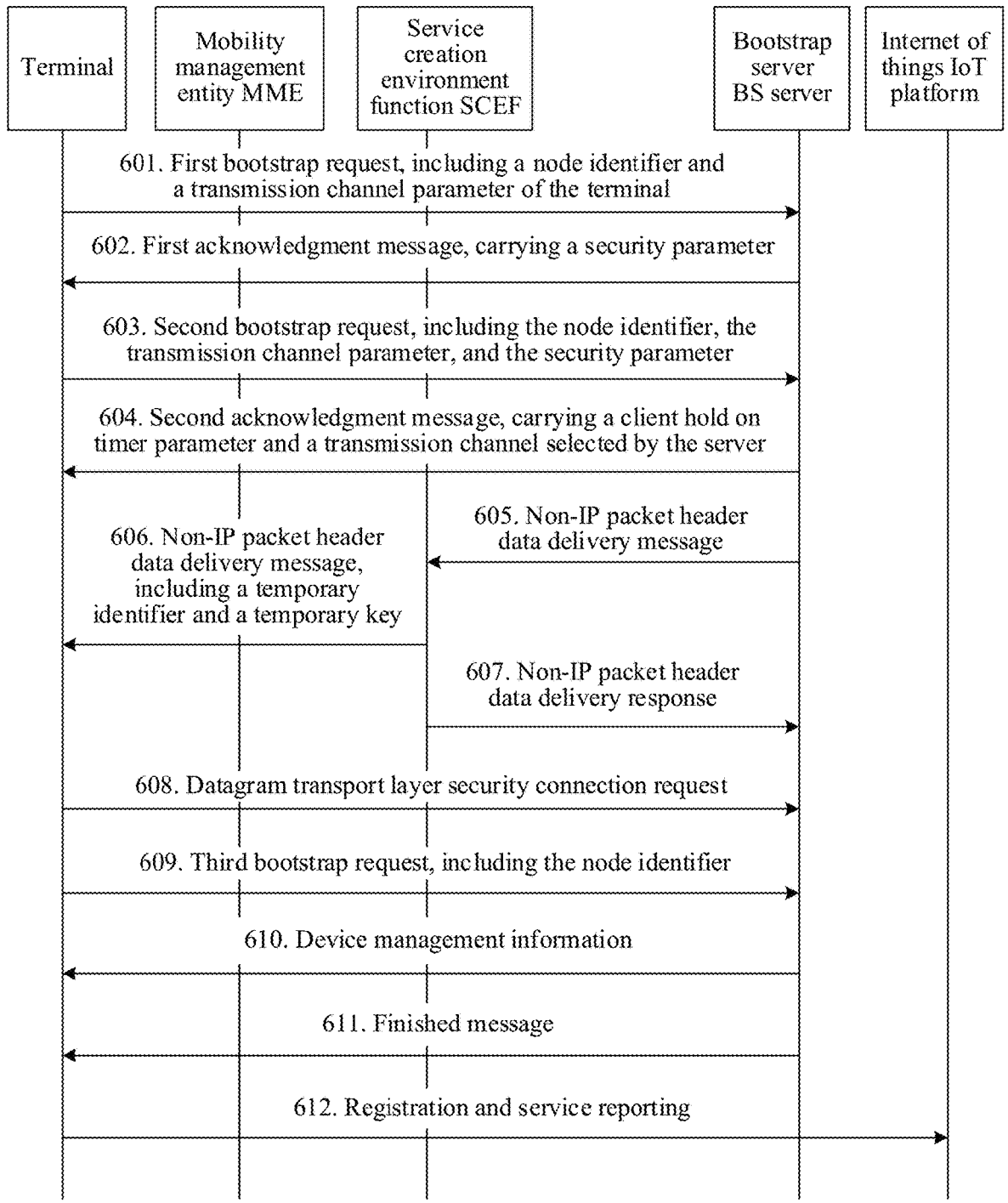
FIG. 6 is a schematic diagram of another embodiment of a device bootstrap method according to an embodiment of this application.

FIG. 6 is a schematic diagram of an embodiment of a device bootstrap method according to an embodiment of this application.

601. A terminal sends a first bootstrap request to a server, where the first bootstrap request includes a node ID and a transmission channel parameter of the terminal.

In this embodiment of this application, the server herein may be described using a BS server as an example. The terminal may initiate the first bootstrap request to the BS server on a public network, where the first bootstrap request carries the node ID and the transmission channel parameter. The transmission channel parameter may include information such as a UE MT channel capability parameter.

It may be understood that the UE MT channel capability parameter represents a capability supported by the terminal on a 3GPP network, for example, a device trigger capability, an MT SMS capability, and an MT NIDD capability such that the BS server selects a specific channel for addressing the terminal.

It should be noted that a node ID (also referred to as an end point name) of a device and a correspondence between the node ID of the terminal and an ID of the terminal on the 3GPP network are preset on the BS server. For example, the ID on the 3GPP network includes parameters such as an MSISDN and an external ID, and is used for addressing the terminal.

The node ID of the terminal may further include a MAC address, an IMEI, a PIN code, a SN, and the like.

602. The server sends a first ACK message to the terminal, where the first ACK message carries a security parameter.

The BS server may determine the corresponding ID of the terminal on the 3GPP network based on the node ID, and further determine, based on the UE MT channel capability parameter, a specific channel to address the UE. In an embodiment, the BS server may return the first ACK message to the terminal according to the first bootstrap request. The first ACK message carries the security parameter. For example, the security parameter may include a cookie parameter and the like. It may be understood that the security parameter is allocated by the BS server, and is used to prevent a DOS attack.

603. The terminal sends a second bootstrap request to the server, where the second bootstrap request includes the node ID, the transmission channel parameter of the terminal, and the security parameter.

The terminal reinitiates the second bootstrap request to the BS server. The second bootstrap request may carry the node ID, the UE MT channel capability, and the security parameter that is just received from the BS server. The node ID and the UE MT channel capability parameter in this step are the same as those in step 501. The security parameter is used by the server to verify information, for example, determine whether the security parameter is a security parameter previously delivered by the server to the UE. If the security parameter is the security parameter previously delivered by the server to the UE, the server does not reject the second bootstrap request sent by the UE. If the security parameter is not the security parameter previously delivered by the server to the UE, the server may reject the second bootstrap request sent by the UE. For example, the security parameter may include a cookie parameter and the like.

604. The server sends a second ACK message to the terminal, where the second ACK message carries a client hold on timer parameter and a transmission channel selected by the server.

If the BS server checks that the security parameter and the node ID are correct, the BS server returns the second ACK message to the terminal. The second ACK message carries the client hold on timer parameter (indicating that the terminal does not enter a hibernated state within a specified time) and the transmission channel selected by the server. The transmission channel selected by the server may include information such as a selected MT channel parameter. A channel indicated by the transmission channel parameter may include a device trigger channel, a MT SMS channel, a MT NIDD channel, and the like. In this embodiment, the channel selected by the server is a non-IP packet header data delivery channel. The client hold on timer parameter is an empirical value determined by the server.

605. The server sends an MT NIDD message to a SCEF network element, where the MT NIDD message includes a temporary ID and a temporary key.

The BS server invokes, based on the ID of the terminal associated with the 3GPP network, a MT NIDD capability of the SCEF network element, to send the MT NIDD message to the terminal. The MT NIDD message includes a PSKID, and the temporary key may include a PSK parameter and the like.

The PSKID and the PSK parameter that are carried in the MT NIDD message are determined by the server based on the node ID reported by the terminal. It should be noted that communication between the terminal and the SCEF network element is usually internal communication on the 3GPP network. Therefore, reliability is relatively high. The SCEF network element usually communicates with the server through a RESTful interface based on HTTPS, and encryption and integrity protection are performed during communication transmission.

606. The SCEF network element sends the MT NIDD message to the terminal.

The SCEF network element invokes an internal capability of the 3GPP network to complete an MT NIDD procedure, and sends the temporary PSK ID and the PSK parameter to the terminal.

607. The SCEF network element sends an MT NIDD response to the server.

After the SCEF network element sends the MT NIDD to the terminal, the SCEF network element sends the MT NIDD response message to the BS server, to indicate a sending success.

608. The terminal initiates a DTLS connection request to the server.

The terminal sends the connection request to the server based on the temporary ID and the temporary key. The server receives the connection request sent by the terminal, and the server establishes a secure channel with the terminal according to the connection request.

For example, the terminal initiates a DTLS connection request to the BS server using the temporary PSKID and the PSK parameter. In this case, the BS server completes authentication on the terminal and establishment of a secure link. (Though a terminal maliciously forges the node ID, the MT NIDD message is finally sent to the real terminal associated with the node ID because the ID on 3GPP cannot be forged, the malicious terminal cannot obtain the temporary PSKID and the PSK parameter, and a DTLS link cannot be established.)

609. The terminal sends a third bootstrap request to the server, where the third bootstrap request includes the node ID.

The terminal reinitiates the third bootstrap request to the BS server. The third bootstrap request carries the node ID. In this case, the third bootstrap request is transmitted through the secure channel.

610. The server sends DM information to the terminal.

The BS server delivers the DM information to the terminal. The DM information includes parameters such as an ID and a PSK that correspond to the terminal on a current platform accessed by the terminal. The step may be performed a plurality of times. If the terminal currently accesses a plurality of platforms, the BS server correspondingly sends a plurality of pieces of DM information to the terminal. Each piece of DM information includes parameters such as an ID and a PSK that correspond to the terminal on each platform accessed by the terminal.

611. The server sends a finished message to the terminal.

After the server completes delivering all DM information to the terminal, the BS server delivers the finished message to the terminal, and the current bootstrap procedure ends.

612. The terminal initiates registration and service reporting procedures to an IoT platform.

The terminal initiates procedures such as registration and service data reporting to the IoT platform based on the DM information.

In this embodiment of this application, though the terminal maliciously forges the node ID, the MT NIDD message is finally sent to the real terminal associated with the node ID because the ID on 3GPP cannot be forged, the malicious terminal cannot obtain the temporary PSKID and the PSK parameter, and the DTLS link cannot be established. Therefore, a secure bootstrap process is provided. The secure bootstrap process is imperceptible to a chip vendor, a module vendor, and a device vendor. An application vendor holds a real security credential, and the device vendor neither needs to add an additional manufacture operation, nor needs to support a delivery capability according to an order. Therefore, a supply chain design requirement for the device vendor is simplified.

When the terminal requests the server to provision the DM information, the server can verify, based on the associated ID of the terminal on the 3GPP network when the terminal registers an account in the BS server (the ID is set by an application server, and may be considered to be secure), whether the terminal is an authorized device, and send the temporary ID and the temporary key to the terminal through a 3GPP network channel. The terminal establishes a secure connection with the server using the temporary ID and the temporary key. The server returns sensitive data such as a real ID, a key, and subscribed service information based on the secure connection, to complete a data provisioning process. The temporary ID and the temporary key are released after current use.

It should be noted that expressions such as "first", "second", and "third" in this application are not actual names. For example, the first bootstrap request in the foregoing embodiments does not mean that the bootstrap request is referred to as the first bootstrap request. The expressions such as "first" and "second" are merely used to distinguish between a plurality of bootstrap requests sent by the terminal to the server, and do not constitute a limitation on the actual protection scope of this application.

Figure 7:
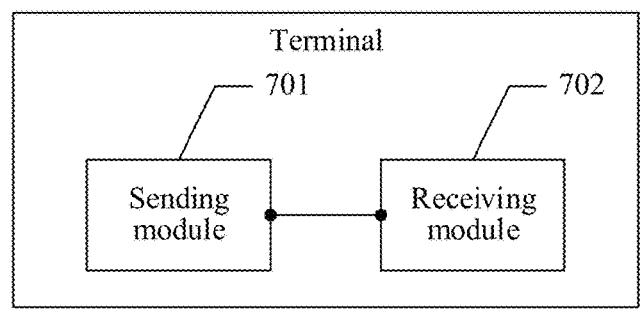
FIG. 7 is a schematic diagram of an embodiment of a terminal according to an embodiment of this application.

FIG. 7 is a schematic diagram of an embodiment of a terminal according to an embodiment of this application, and the terminal includes a sending module 701 configured to send a second bootstrap request to a server, where the second bootstrap request includes a node ID and a transmission channel parameter of the terminal, and the transmission channel parameter is used to indicate a transmission channel supported by the terminal, and a receiving module 702 configured to receive a second acknowledgment message that is sent by the server according to the second bootstrap request, where the second acknowledgment message carries a transmission channel selected by the server, and the transmission channel selected by the server is determined by the server based on the transmission channel parameter.

The receiving module 702 is further configured to receive a temporary ID indication message sent by a forwarding apparatus. The temporary ID indication message includes a temporary ID and a temporary key. The forwarding apparatus is a network element that is configured to send a message to the terminal through the transmission channel selected by the server.

The sending module 701 is further configured to send a connection request to the server based on the temporary ID and the temporary key, where the connection request is used to request to establish a secure channel with the server.

Optionally, in some embodiments of this application, the transmission channel selected by the server includes a device trigger transmission channel, the temporary ID includes a PSKID, and the temporary key includes a PSK.

The receiving module 702 is further configured to receive, through the device trigger transmission channel, a trigger request sent by a MTC-IWF network element. The trigger request includes the PSKID and the PSK.

Optionally, in some embodiments of this application, the transmission channel selected by the server includes a short message service transmission channel, the temporary ID includes a PSKID, and the temporary key includes a PSK.

The receiving module 702 is further configured to receive, through the short message service transmission channel, a MT SMS message sent by a SMSC network element. The MT SMS message includes the PSKID and the PSK.

Optionally, in some embodiments of this application, the transmission channel selected by the server includes a data transmission channel, the temporary ID includes a PSKID, and the temporary key includes a PSK.

The receiving module 702 is further configured to receive, through the data transmission channel, a non-IP packet header data delivery message sent by a SCEF network element. The non-IP packet header data delivery message includes the PSKID and the PSK.

Optionally, in some embodiments of this application, the sending module 701 is further configured to send a first bootstrap request to a server, where the first bootstrap request includes the node ID and the transmission channel parameter of the terminal.

The receiving module 702 is further configured to receive a first acknowledgment message that is sent by the server according to the first bootstrap request. The first acknowledgment message carries a security parameter.

Optionally, in some embodiments of this application, the sending module 701 is further configured to send a third bootstrap request to the server through the secure channel, where the third bootstrap request includes the node ID of the terminal.

The receiving module 702 is further configured to receive DM information that is sent by the server according to the third bootstrap request.

Optionally, in some embodiments of this application, the sending module 701 is further configured to send a registration request and service data to an IoT platform based on the DM information.

Optionally, in some embodiments of this application, the second acknowledgment message further carries a hold on timer parameter. That the terminal receives a temporary ID indication message sent by the forwarding apparatus includes the following step.

The terminal receives, based on the hold on timer parameter within a preset time, the temporary ID indication message sent by the forwarding apparatus.

Figure 8:
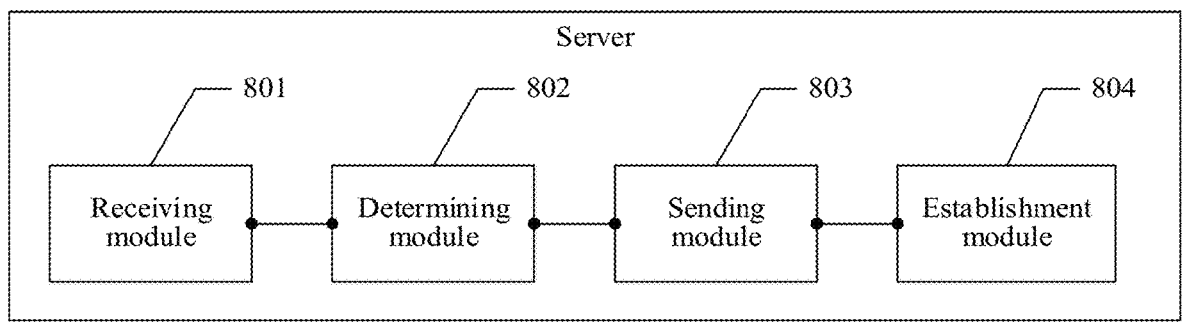
FIG. 8 is a schematic diagram of an embodiment of a server according to an embodiment of this application.

FIG. 8 is a schematic diagram of an embodiment of a server according to an embodiment of this application. The server includes a receiving module 801 configured to receive a second bootstrap request sent by a terminal, where the second bootstrap request includes a node ID and a transmission channel parameter of the terminal, and the transmission channel parameter is used to indicate a transmission channel supported by the terminal, a determining module 802 configured to determine a forwarding apparatus based on the node ID and the transmission channel parameter, a sending module 803 configured to send a second acknowledgment message to the terminal, where the second acknowledgment message carries a transmission channel selected by the server, and the transmission channel selected by the server is used to indicate that the terminal receives, through the transmission channel selected by the server, a message sent by the server, where the sending module 803 is further configured to send a temporary ID indication message to the forwarding apparatus, where the temporary ID indication message includes a temporary ID and a temporary key, and the temporary ID and the temporary key are used by the terminal to initiate a connection request, and the receiving module 801 is further configured to receive the connection request sent by the terminal, and an establishment module 804 configured to establish a secure channel with the terminal according to the connection request.

Optionally, in some embodiments of this application, the transmission channel selected by the server includes a device trigger transmission channel, the temporary ID includes a PSKID, and the temporary key includes a PSK.

The sending module 803 is further configured to send, through the device trigger transmission channel, a trigger request to a MTC-IWF network element, where the trigger request includes the P SKID and the PSK.

Optionally, in some embodiments of this application, the transmission channel selected by the server includes a short message service transmission channel, the temporary ID includes a PSKID, and the temporary key includes a PSK.

The sending module 803 is further configured to send, through the short message service transmission channel, a MT SMS message to a SMSC network element, where the MT SMS message includes the PSKID and the PSK.

Optionally, in some embodiments of this application, the transmission channel selected by the server includes a data transmission channel, the temporary ID includes a PSKID, and the temporary key includes a PSK.

The sending module 803 is further configured to send, through the data transmission channel, a non-IP packet header data delivery message to a SCEF network element, where the non-IP packet header data delivery message includes the PSKID and the PSK.

Optionally, in some embodiments of this application, the receiving module 801 is configured to receive a first bootstrap request sent by the terminal, where the first bootstrap request includes the node ID and the transmission channel parameter of the terminal.

The sending module 803 is configured to send a first acknowledgment message to the terminal based on the node ID and the transmission channel parameter of the terminal. The first acknowledgment message carries a security parameter, and the security parameter is used by the terminal to prevent a DOS attack.

Optionally, in some embodiments of this application, the receiving module 801 is configured to receive a third bootstrap request sent by the terminal, where the third bootstrap request includes the node ID of the terminal.

The sending module 803 is configured to send DM information to the terminal based on the node ID of the terminal.

Optionally, in some embodiments of this application, the second acknowledgment message further carries a hold on timer parameter. The hold on timer parameter is used to indicate that the terminal does not enter a hibernated state within a preset time.

Figure 9:
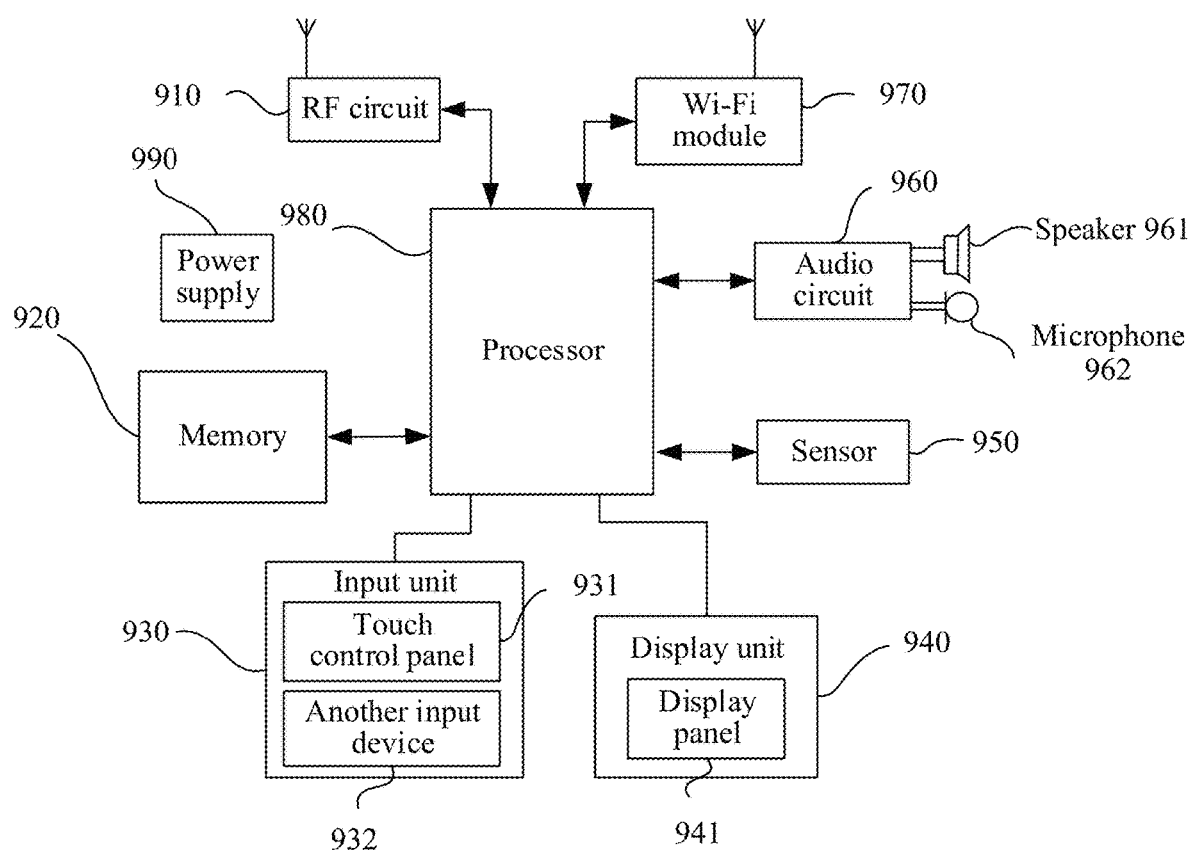
FIG. 9 is a schematic diagram of another embodiment of a terminal according to an embodiment of this application.

FIG. 9 is a schematic diagram of another embodiment of a terminal according to an embodiment of this application. The terminal is described using a mobile phone as an example. FIG. 9 is a block diagram of a partial structure of the mobile phone related to the terminal according to this embodiment of this application. Referring to FIG. 9, the mobile phone includes components such as a radio frequency (RF) circuit 910, a memory 920, an input unit 930, a display unit 940, a sensor 950, an audio circuit 960, a WI-FI module 970, a processor 980, and a power supply 990. Persons skilled in the art may understand that the structure of the mobile phone shown in FIG. 9 constitutes no limitation on the mobile phone. The mobile phone may include more or fewer components than those shown in this figure, may combine some components, or may have different component arrangements.

The following describes each component included in the mobile phone in detail with reference to FIG. 9.

The RF circuit 910 may be configured to receive or send a signal in an information receiving or sending process or a call process. In particular, after receiving downlink information from a base station, the RF circuit 910 sends the downlink information to the processor 980 for processing. In addition, the RF circuit 910 sends related uplink data to the base station. The RF circuit 910 usually includes but is not limited to an antenna, at least one amplifier, a transceiver, a coupler, a low noise amplifier (LNA), a duplexer, and the like. In addition, the RF circuit 910 may further communicate with a network and another device through radio communication. Any communications standard or protocol may be used in the radio communication, including but not limited to a Global System for Mobile communication (GSM), a General Packet Radio Service (GPRS), code division multiple access (CDMA), wideband code division multiple access (WCDMA), Long Term Evolution (LTE), an email, an SMS, and the like.

The memory 920 may be configured to store a software program and a module. The processor 980 executes various function applications of the mobile phone and performs data processing by running the software program and the module that are stored in the memory 920. The memory 920 may mainly include a program storage area and a data storage area. The program storage area may store an operating system, an application program required by at least one function (such as a voice playback function or an image playback function), and the like. The data storage area may store data (such as audio data and a phone book) created based on use of the mobile phone, and the like. In addition, the memory 920 may include a high speed RAM, and may further include a nonvolatile memory, for example, at least one magnetic disk storage device, a flash storage device, or another volatile solid-state storage device.

The input unit 930 may be configured to receive input digit or character information, and generate key signal input related to user settings and function control of the mobile phone. Further, the input unit 930 may include a touch control panel 931 and another input device 932. The touch control panel 931, also referred to as a touchscreen, may collect a touch operation (for example, an operation of a user on the touch control panel 931 or near the touch panel 931 using any proper object or accessory such as a finger or a tablet pen) of the user on or near the touch control panel 931, and drive a corresponding connection apparatus based on a preset program. Optionally, the touch control panel 931 may include two components a touch detection apparatus and a touch controller. The touch detection apparatus detects a touch direction of a user, detects a signal brought by the touch operation, and transmits the signal to the touch controller. The touch controller receives touch information from the touch detection apparatus, converts the touch information into a coordinate of a touch point. Then the touch controller sends the coordinate of the touch point to the processor 980, and can receive and execute a command sent by the processor 980. In addition, the touch control panel 931 may be implemented in a plurality of types, such as a resistive type, a capacitive type, an infrared type, and a surface acoustic wave type. In addition to the touch control panel 931, the input unit 930 may further include the other input device 932. Further, the other input device 932 may include but are not limited to one or more of a physical keyboard, a function key (for example, a volume control press key or a power on/off press key), a trackball, a mouse, a joystick, and the like.

The display unit 940 may be configured to display information input by the user or information provided for the user, and various menus of the mobile phone. The display unit 940 may include a display panel 941. Optionally, the display panel 941 may be configured in a form such as a liquid crystal display (LCD) or an organic light-emitting diode (OLED). Further, the touch control panel 931 may cover the display panel 941. When detecting the touch operation on or near the touch control panel 931, the touch control panel 931 transmits the touch operation to the processor 980 to determine a type of a touch event. Then the processor 980 provides a corresponding visual output on the display panel 941 based on the type of the touch event. In FIG. 9, the touch control panel 931 and the display panel 941 are used as two independent components to implement input and output functions of the mobile phone. However, in some embodiments, the touch control panel 931 and the display panel 941 may be integrated to implement the input and output functions of the mobile phone.

The mobile phone may further include at least one sensor 950, for example, a light sensor, a motion sensor, and another sensor. Further, the light sensor may include an ambient light sensor and a proximity sensor. The ambient light sensor may adjust luminance of the display panel 941 based on brightness of ambient light. The proximity sensor may power off the display panel 941 and/or backlight when the mobile phone moves close to an ear. As a type of the motion sensor, an accelerometer sensor may detect values of acceleration in all directions (usually, three axes), may detect a value and a direction of gravity when the mobile phone is still. The accelerometer sensor may be applied to an application for identifying the mobile phone posture (such as landscape-to-portrait switch, a related game, and magnetometer posture calibration), a function related to vibration identification (such as a pedometer or a knock), or the like. Another sensor such as a gyroscope, a barometer, a hygrometer, a thermometer, and an infrared sensor may be further configured in the mobile phone. Details are not described herein again.

The audio circuit 960, a speaker 961, and a microphone 962 may provide an audio interface between the user and the mobile phone. The audio circuit 960 may transmit, to the speaker 961, an electrical signal converted from received audio data. The speaker 961 converts the electrical signal into a sound signal for output. In addition, the microphone 962 converts a collected sound signal into an electrical signal. The audio circuit 960 receives the electrical signal, converts the electrical signal into audio data, and then outputs the audio data to the processor 980 for processing. Then, the audio data is sent to, for example, another mobile phone, using the RF circuit 910, or the audio data is output to the memory 920 for further processing.

WI-FI belongs to a short-distance wireless transmission technology. The mobile phone may help, using the WI-FI module 970, the user send and receive an email, browse a web page, access streaming media, and the like. The WI-FI module 970 provides wireless broadband internet access for the user. Although FIG. 9 shows the WI-FI module 970, it may be understood that the WI-FI module 970 is not mandatory included in the mobile phone. The WI-FI module 970 may be omitted based on a requirement without changing the scope of essence of the present disclosure.

The processor 980 is a control center of the mobile phone. The processor 980 connects each part of the entire mobile phone through various interfaces and lines. In addition, the processor 980 performs various functions of the mobile phone and data processing by running or executing the software program and/or the module that are/is stored in the memory 920 and invoking data stored in the memory 920 in order to perform overall monitoring on the mobile phone. Optionally, the processor 980 may include one or more processing units. Preferably, an application processor and a modem processor may be integrated in the processor 980. The application processor mainly processes an operating system, a user interface, an application program, and the like. The modem processor mainly processes radio communication. It may be understood that the modem processor may alternatively not be integrated into the processor 980.

The mobile phone further includes the power supply 990 (for example, a battery) supplying power to all components. Preferably, the power supply may be logically connected to the processor 980 using a power management system, to implement functions such as management of charging, discharging, and power consumption using the power management system.

Although not shown, the mobile phone may further include a camera, a BLUETOOTH module, and the like. Details are not described herein again.

The steps performed by the terminal in the foregoing embodiments may be based on the structure of the terminal shown in FIG. 9.

In this embodiment of this application, the RF circuit 910 is configured to send a second bootstrap request to a server, where the second bootstrap request includes a node ID and a transmission channel parameter of a terminal, and the transmission channel parameter is used to indicate a transmission channel supported by the terminal, receive a second acknowledgment message that is sent by the server according to the second bootstrap request, where the second acknowledgment message carries a transmission channel selected by the server, and the transmission channel selected by the server is determined by the server based on the transmission channel parameter, receive a temporary ID indication message sent by a forwarding apparatus, where the temporary ID indication message includes a temporary ID and a temporary key, and the forwarding apparatus is a network element that is configured to send a message to the terminal through the transmission channel selected by the server, and send a connection request to the server based on the temporary ID and the temporary key, where the connection request is used to request to establish a secure channel with the server.

Optionally, in some embodiments of this application, the transmission channel selected by the server includes a device trigger transmission channel, the temporary ID includes a PSKID, and the temporary key includes a PSK.

The RF circuit 910 is further configured to receive, through the device trigger transmission channel, a trigger request sent by a MTC-IWF network element, where the trigger request includes the P SKID and the PSK.

Optionally, in some embodiments of this application, the transmission channel selected by the server includes a short message service transmission channel, the temporary ID includes a PSKID, and the temporary key includes a PSK.

The RF circuit 910 is further configured to receive, through the short message service transmission channel, a MT SMS message sent by a SMSC network element, where the MT SMS message includes the PSKID and the PSK.

Optionally, in some embodiments of this application, the transmission channel selected by the server includes a data transmission channel, the temporary ID includes a PSKID, and the temporary key includes a PSK.

The RF circuit 910 is further configured to receive, through the data transmission channel, a non-IP packet header data delivery message sent by a SCEF network element, where the non-IP packet header data delivery message includes the PSKID and the PSK.

Optionally, in some embodiments of this application, the RF circuit 910 is further configured to send a first bootstrap request to the server, where the first bootstrap request includes the node ID and the transmission channel parameter of the terminal, and receive a first acknowledgment message that is sent by the server according to the first bootstrap request, where the first acknowledgment message carries a security parameter.

Optionally, in some embodiments of this application, the RF circuit 910 is further configured to send a third bootstrap request to the server through the secure channel, where the third bootstrap request includes the node ID of the terminal, and receive, through the secure channel, DM information that is sent by the server according to the third bootstrap request.

Optionally, in some embodiments of this application, the RF circuit 910 is further configured to send a registration request and service data to an IoT platform based on the DM information.

Optionally, in some embodiments of this application, the RF circuit 910 is further configured to receive, based on the hold on timer parameter within a preset time, the temporary ID indication message sent by the forwarding apparatus.

Figure 10:
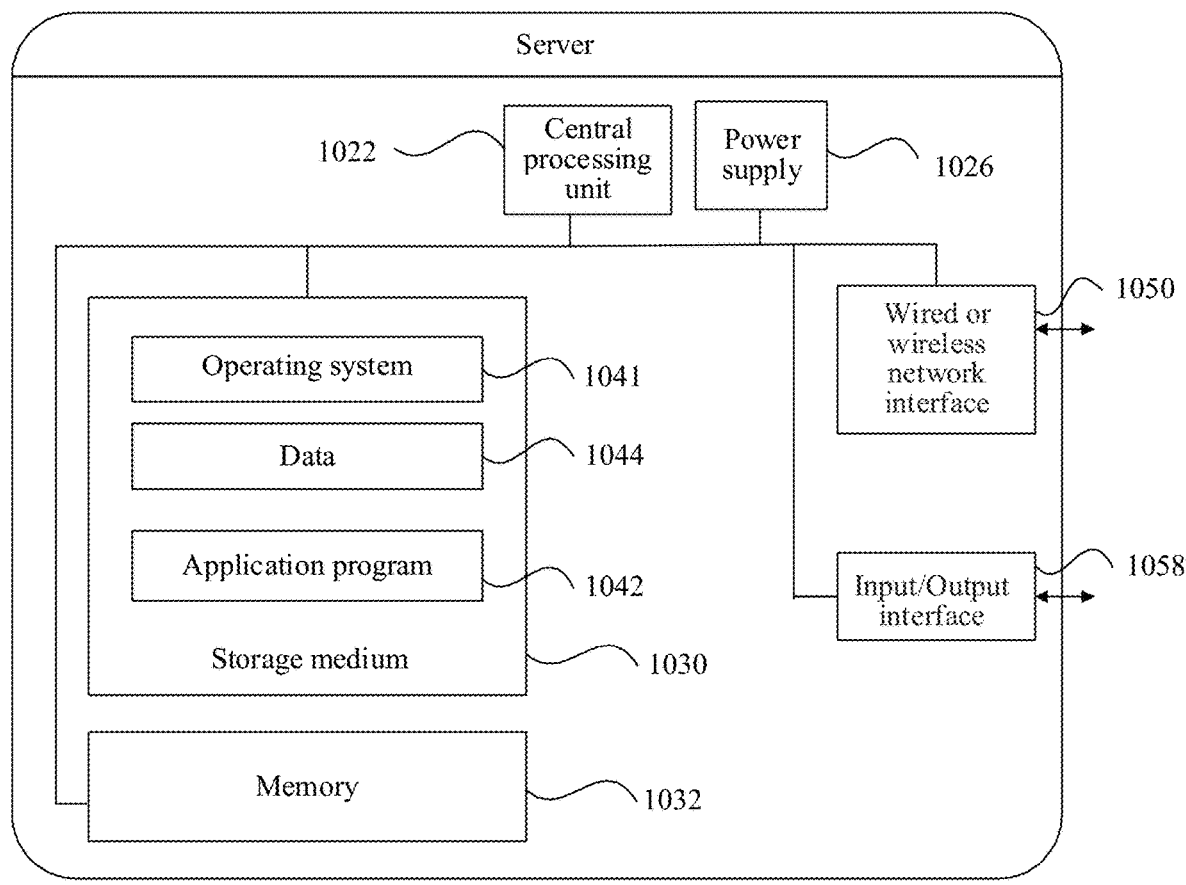
FIG. 10 is a schematic diagram of another embodiment of a server according to an embodiment of this application.

FIG. 10 is a schematic structural diagram of a server according to an embodiment of the present disclosure. The server may have a relatively large difference because of different configuration or performance. The server may include at least one central processing unit (CPU) 1022 (for example, at least one processor), a memory 1032, and at least one storage medium 1030 (for example, at least one mass storage device) storing an application program 1042 or data 1044. The memory 1032 and the storage medium 1030 may be used for temporary storage or permanent storage. A program stored in the storage medium 1030 may include at least one module (not shown in the figure), and each module may include a series of instruction operations for the server. Further, the CPU 1022 may be configured to communicate with the storage medium 1030, and perform, on the server, the series of instruction operations in the storage medium 1030.

The server may further include at least one power supply 1026, at least one wired or wireless network interface 1050, at least one input/output interface 1058, and/or, at least one operating system 1041, such as Windows Server™, Mac OS X™, Unix™, Linux™, and FreeBSD™.

The steps performed by the server in the foregoing embodiments may be based on the server structure shown in FIG. 10.

In this embodiment of this application, the at least one wired or wireless network interface 1050 is configured to receive a second bootstrap request sent by a terminal. The second bootstrap request includes a node ID and a transmission channel parameter of the terminal. The transmission channel parameter is used to indicate a transmission channel supported by the terminal.

The at least one CPU 1022 is configured to determine a forwarding apparatus based on the node ID and the transmission channel parameter.

The at least one wired or wireless network interface 1050 is further configured to send a second acknowledgment message to the terminal. The second acknowledgment message carries a transmission channel selected by the server. The transmission channel selected by the server is used to indicate that the terminal receives, through the transmission channel selected by the server, a message sent by the server.

The at least one wired or wireless network interface 1050 is further configured to send a temporary ID indication message to the forwarding apparatus, where the temporary ID indication message includes a temporary ID and a temporary key, and the temporary ID and the temporary key are used by the terminal to initiate a connection request, and receive the connection request sent by the terminal.

The at least one CPU 1022 is further configured to establish a secure channel with the terminal according to the connection request.

Optionally, in some embodiments of this application, the transmission channel selected by the server includes a device trigger transmission channel, the temporary ID includes a PSKID, and the temporary key includes a PSK.

The at least one wired or wireless network interface 1050 is further configured to send, through the device trigger transmission channel, a trigger request to a MTC-IWF network element. The trigger request includes the PSKID and the PSK.

Optionally, in some embodiments of this application, the transmission channel selected by the server includes a short message service transmission channel, the temporary ID includes a PSKID, and the temporary key includes a PSK.

The at least one wired or wireless network interface 1050 is further configured to send, through the short message service transmission channel, a MT SMS message to a SMSC network element. The MT SMS message includes the PSKID and the PSK.

Optionally, in some embodiments of this application, the transmission channel selected by the server includes a data transmission channel, the temporary ID includes a PSKID, and the temporary key includes a PSK.

The at least one wired or wireless network interface 1050 is further configured to send, through the data transmission channel, a non-IP packet header data delivery message to a SCEF network element. The non-IP packet header data delivery message includes the PSKID and the PSK.

Optionally, in some embodiments of this application, the at least one wired or wireless network interface 1050 is further configured to send a first acknowledgment message to the terminal based on the node ID and the transmission channel parameter of the terminal, where the first acknowledgment message carries a security parameter, and the security parameter is used by the terminal to prevent a DOS attack.

The at least one wired or wireless network interface 1050 is further configured to receive a third bootstrap request sent by the terminal, where the third bootstrap request includes the node ID of the terminal, and send DM information to the terminal based on the node ID of the terminal.

Optionally, in some embodiments of this application, the second acknowledgment message further carries a hold on timer parameter. The hold on timer parameter is used to indicate that the terminal does not enter a hibernated state within a preset time.

All or some of the foregoing embodiments may be implemented using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, including one or more integrated usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments according to this application, it should be understood that the disclosed system, apparatus, and method may be implemented in another manner. For example, the described apparatus embodiment is merely an example. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connection may be implemented through some interfaces. The indirect couplings or communication connection between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or at least two units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to another approach, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of this application. The storage medium includes various media that may store program code, such as a Universal Serial Bus (USB) flash drive, a removable hard disk, a ROM, a RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A device bootstrap method implemented by a terminal, wherein the device bootstrap method comprises:
    sending a first bootstrap request to a server, wherein the first bootstrap request comprises a node identifier and a transmission channel parameter of the terminal;
    receiving, by the terminal, a first acknowledgment message from the server in response to the first bootstrap request, wherein the first acknowledgment message identifies a transmission channel associated with the transmission channel parameter;
    receiving, through the transmission channel, a temporary identifier indication message from a forwarding apparatus, wherein the temporary identifier indication message comprises a temporary identifier and a temporary key; and
    sending a connection request to the server based on the temporary identifier and the temporary key,
    wherein the connection request requests establishing a secure channel with the server.

2. The device bootstrap method of claim 1, wherein the transmission channel comprises a device trigger transmission channel, wherein the temporary identifier comprises a pre-shared key identifier, wherein the temporary key comprises a pre-shared key, wherein the device bootstrap method further comprises receiving a trigger request from a machine type communication interworking function network element through the device trigger transmission channel, and wherein the trigger request comprises the pre-shared key identifier and the pre-shared key.

3. The device bootstrap method of claim 1, wherein the transmission channel comprises a short message service transmission channel, wherein the temporary identifier comprises a pre-shared key identifier, wherein the temporary key comprises a pre-shared key, wherein the device bootstrap method further comprises receiving a mobile terminated short message service (MT SMS) message from a short message service center network element through the short message service transmission channel, and wherein the MT SMS comprises the pre-shared key identifier and the pre-shared key.

4. The device bootstrap method of claim 1, wherein the transmission channel comprises a data transmission channel, wherein the temporary identifier comprises a pre-shared key identifier, wherein the temporary key comprises a pre-shared key, wherein the device bootstrap method further comprises receiving, through the data transmission channel, a non-Internet Protocol (IP) packet header data delivery message from a service creation environment function network element, and wherein the non-IP packet header data delivery message comprises the pre-shared key identifier and the pre-shared key.

5. The device bootstrap method of claim 1, wherein the first bootstrap request further comprises a security parameter, wherein before sending the first bootstrap request to the server, the device bootstrap method further comprises:
    sending a second bootstrap request to the server, wherein the second bootstrap request comprises the node identifier and the transmission channel parameter of the terminal; and
    receiving a second acknowledgment message from the server according to the second bootstrap request, wherein the second acknowledgment message carries the security parameter.

6. The device bootstrap method of claim 1, wherein after sending the connection request to the server, the device bootstrap method further comprises:
    sending a third bootstrap request to the server through the secure channel, wherein the third bootstrap request comprises the node identifier of the terminal; and
    receiving, through the secure channel, device management information from the server according to the third bootstrap request.

7. A device bootstrap method, implemented by a server, wherein the device bootstrap method comprises:
    receiving a first bootstrap request from a terminal, wherein the first bootstrap request comprises a node identifier of the terminal and a transmission channel parameter of the terminal;
    determining a forwarding apparatus based on the node identifier and the transmission channel parameter;
    selecting a transmission channel;

sending a first acknowledgment message to the terminal, wherein the first acknowledgment message identifies the transmission channel;

sending a temporary identifier indication message for initiating a connection request to the forwarding apparatus, wherein the temporary identifier indication message comprises a temporary identifier and a temporary key;

receiving the connection request from the terminal; and establishing a secure channel with the terminal according to the connection request.

8. The device bootstrap method according claim 7, wherein the first bootstrap request further comprises a security parameter based on a second bootstrap request, wherein before receiving the first bootstrap request from the terminal, the device bootstrap method further comprises:

receiving the second bootstrap request from the terminal, wherein the second bootstrap request comprises the node identifier and the transmission channel parameter of the terminal; and sending, in response to the second bootstrap request, a second acknowledgment message to the terminal based on the node identifier and the transmission channel parameter of the terminal, wherein the second acknowledgment message carries the security parameter, and wherein the security parameter prevents a denial-of-service attack.

9. The device bootstrap method of claim 7, wherein after the establishing, the device bootstrap method further comprises:

receiving a third bootstrap request from the terminal, wherein the third bootstrap request comprises the node identifier of the terminal; and sending device management information to the terminal based on the node identifier of the terminal.

10. A terminal, comprising:

a processor; and a memory coupled to the processor and storing instructions that, when executed by the processor, cause the terminal to be configured to:

send a first bootstrap request to a server, wherein the first bootstrap request comprises a node identifier and a transmission channel parameter of the terminal;

receive, a first acknowledgment message from the server in response to the bootstrap request, wherein the first acknowledgment message identifies a transmission channel associated with the transmission channel parameter;

receive a temporary identifier indication message from a forwarding apparatus through the transmission channel, wherein the temporary identifier indication message comprises a temporary identifier and a temporary key; and send a connection request to the server based on the temporary identifier and the temporary key, wherein the connection request requests establishing a secure channel with the server.

11. The terminal of claim 10, wherein the transmission channel comprises a device trigger transmission channel, wherein the temporary identifier comprises a pre-shared key identifier, wherein the temporary key comprises a pre-shared key, wherein the instructions further cause the processor to be configured to receive a trigger request from a machine type communication interworking function network element through the device trigger transmission channel, and wherein the trigger request comprises the pre-shared key identifier and the pre-shared key.

12. The terminal of claim 10, wherein the transmission channel comprises a short message service transmission channel, wherein the temporary identifier comprises a pre-shared key identifier, wherein the temporary key comprises a pre-shared key, wherein the instructions further cause the processor to be configured to receive, through the short message service transmission channel, a mobile terminated short message service (MT SMS) message from a short message service center network element, and wherein the MT SMS message comprises the pre-shared key identifier and the pre-shared key.

13. The terminal of claim 10, wherein the transmission channel comprises a data transmission channel, wherein the temporary identifier comprises a pre-shared key identifier, wherein the temporary key comprises a pre-shared key, wherein the instructions further cause the processor to be configured to receive, through the data transmission channel, a non-Internet Protocol (IP) packet header data delivery message from a service creation environment function network element, and wherein the non-IP packet header data delivery message comprises the pre-shared key identifier and the pre-shared key.

14. The terminal of claim 10, wherein the first bootstrap request further comprises a security parameter, wherein the instructions further cause the processor to be configured to:

send a second bootstrap request to the server, wherein the second bootstrap request comprises the node identifier of the terminal and the transmission channel parameter of the terminal; and receive a second acknowledgment message from the server according to the second bootstrap request, wherein the second acknowledgment message carries the security parameter.

15. The terminal of claim 10, wherein the instructions further cause the processor to be configured to:

send a third bootstrap request to the server through the secure channel, wherein the third bootstrap request comprises the node identifier of the terminal; and receive, through the secure channel, device management information from the server according to the third bootstrap request.

16. A server comprising:

a processor; and a memory coupled to the processor and storing instructions that, when executed by the processor, cause the server to be configured to:

receive a first bootstrap request from a terminal, wherein the first bootstrap request comprises a node identifier of the terminal and a transmission channel parameter of the terminal;

determine a forwarding apparatus based on the node identifier and the transmission channel parameter;

select a transmission channel;

send a first acknowledgment message to the terminal, wherein the first acknowledgment message identifies the transmission channel;

send a temporary identifier indication message for initiating a connection request to the forwarding apparatus, wherein the temporary identifier indication message comprises a temporary identifier and a temporary key;

receive the connection request from the terminal; and establish a secure channel with the terminal according to the connection request.

17. The server of claim 16, wherein the first bootstrap request further comprises a security parameter, and wherein the instructions further cause the processor to be configured to:
- receive a second bootstrap request from the terminal, wherein the second bootstrap request comprises the node identifier and the transmission channel parameter of the terminal; and
- send a first acknowledgment message to the terminal based on the node identifier and the transmission channel parameter of the terminal, wherein the first acknowledgment message carries the security parameter, and wherein the security parameter prevents a denial-of-service attack.

18. The server of claim 16, wherein the instructions further cause the processor to be configured to:
- receive a third bootstrap request from the terminal, wherein the third bootstrap request comprises the node identifier of the terminal; and
- send device management information to the terminal based on the node identifier of the terminal.

\* \* \* \* \*